United States Patent
Behravan et al.

(10) Patent No.: US 11,108,614 B2
(45) Date of Patent: Aug. 31, 2021

(54) APPARATUSES AND METHODS OF SWITCHING BETWEEN DIFFERENT NUMEROLOGIES

(71) Applicant: Telefonaktiebolaget LM Ericsson (publ), Stockholm (SE)

(72) Inventors: Ali Behravan, Stockholm (SE); Muhammad Kazmi, Sundbyberg (SE); Iana Siomina, Täby (SE); Patrizia Testa, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 64 days.

(21) Appl. No.: 16/483,106

(22) PCT Filed: Dec. 21, 2017

(86) PCT No.: PCT/IB2017/058286
§ 371 (c)(1),
(2) Date: Aug. 2, 2019

(87) PCT Pub. No.: WO2018/142202
PCT Pub. Date: Aug. 9, 2018

(65) Prior Publication Data
US 2020/0274671 A1    Aug. 27, 2020

Related U.S. Application Data

(60) Provisional application No. 62/453,777, filed on Feb. 2, 2017.

(51) Int. Cl.
*H04L 27/26* (2006.01)
*H04L 27/00* (2006.01)
(Continued)

(52) U.S. Cl.
CPC ........ *H04L 27/2666* (2013.01); *H04L 5/0092* (2013.01); *H04L 27/0008* (2013.01);
(Continued)

(58) Field of Classification Search
CPC  H04L 5/0092; H04L 27/0008; H04L 27/2666
See application file for complete search history.

(56) References Cited

U.S. PATENT DOCUMENTS

2012/0140778 A1  6/2012  Wang et al.
2017/0094547 A1* 3/2017  Yum .................. H04W 56/001

FOREIGN PATENT DOCUMENTS

WO  2017/005295 A1  1/2017
WO  2017005295 A1   1/2017
WO  2018/097597 A2  5/2018

OTHER PUBLICATIONS

Invitation to Pay Additional Fees and Where Applicable, Protest Fee dated Apr. 24, 2018 and issued in PCT Application No. PCT/IB2017/058286, consisting of 18 pages.
(Continued)

*Primary Examiner* — Kevin C. Harper
(74) *Attorney, Agent, or Firm* — Christopher & Weisberg, P.A.

(57) ABSTRACT

A method, network node and wireless device are provided in which a method in the network node for switching between different numerologies supported by the network node includes determining at least one parameter that can be used by the network node for switching between a first signal operating with a first numerology and a second signal operating with a second numerology; switching between the first signal and the second signal based on the at least one parameter; and after the switching, operating at least one of the first signal and the second signal between the network node and a second node.

20 Claims, 17 Drawing Sheets

(51) Int. Cl.
*H04L 5/00* (2006.01)
*H04W 72/04* (2009.01)

(52) U.S. Cl.
CPC ............ *H04L 5/001* (2013.01); *H04L 5/0028* (2013.01); *H04L 5/0053* (2013.01); *H04L 27/2602* (2013.01); *H04W 72/0453* (2013.01)

(56) References Cited

OTHER PUBLICATIONS

International Search Report and Written Opinion dated Jul. 19, 2018 and issued in PCT Application No. PCT/IB2017/058286, consisting of 23 pages.
Invitation to Restrict or Pay Additional Fees, and, Where Applicable, Protest Fee dated Jan. 8, 2019 and issued in PCT Application No. PCT/IB2017/058286, consisting of 3 pages.
Written Opinion of the International Preliminary Examining Authority dated Feb. 13, 2019 and issued in PCT Application No. PCT/IB2017/058286, consisting of 12 pages.
Notification of Transmittal of the International Preliminary Report on Patentability dated May 23, 2019 and issued in PCT Application No. PCT/IB2017/058286, consisting of 56 pages.
3GPP TS 36.104 V14.2.0 (Dec. 2016) 3rd Generation Partnership Project; Technical Specification Group Radio Access Network; Evolved Universal Terrestrial Radio Access (E-UTRA); Base Station (BS) Radio Transmission and Reception (Release 14), consisting of 218 pages.
3GPP TS 36.101 V14.2.0 (Dec. 2016) 3rd Generation Partnership Project; Technical Specification Group Radio Access Network; Evolved Universal Terrestrial Radio Access (E-UTRA); User Equipment (UE) Radio Transmission and Reception (Release 14), consisting of 1262 pages.
3GPP TS 36.133 V14.2.0 (Dec. 2016) 3rd Generation Partnership Project; Technical Specification Group Radio Access Network; Evolved Universal Terrestrial Radio Access (E-UTRA); Requirements for Support of Radio Resource Management (Release 14), consisting of 2304 pages.
3GPP TSG RAN WG4 Meeting #80-bis, Ljubljana, Slovenia, Oct. 10-14, 2016; R4-168036; Agenda Item: 10.6.1.2; Source: Ericsson; Title: on RRM Requirements for NR; Document for: Discussion, consisting of 4 pages.
3GPP TSG RAN WG1 Meeting #87, Reno, USA, Nov. 14-18, 2016; R1-1611655; Agenda Item: 7.1.1; Source: Huawei, HiSilicon; Title: Mechanisms of Bandwidth Adaptation for Control and Data Reception in Single-Carrier and Multi-Carrier Cases; Document for: Discussion and Decision, consisting of 4 pages.
3PP TSG RAN WG1 Meeting #86b, Lisbon, Portugal, Oct. 10-14, 2016; R1-1609505; Agenda Item: 8.1.2.1; Source: Intel Corporation; Title: Capability to Support Multiple Numerologies; Document for: Discussion and Decision, consisting of 4 pages.
3GPP TSG RAN WG1 Meeting #86bis, Lisbon, Portugal, Oct. 10-14, 2016; R1-1609051; Agenda Item: 8.1.2.1; Source: Samsung; Title: Consideration on UE Capability to Process Multiple Numerologies; Document for: Discussion, consisting of 12 pages.
3GPP TSG-RAN #73, Vienna, Austria, Dec. 5-8, 2016; Tdoc-RP162231; Agenda Item: 10.4.10; Source: Ericsson; Title: Revised WID: eMBMS Enhancements for LTE, consisting of 8 pages.
TSG-RAN WG1 #86bis, Lisbon, Portugal, Oct. 10-14, 2016| R1-1611051; Release 14; Source: RAN1; To: RAN2; Work Item: Further eMBMS Enhancements; Title: LS Regarding Agreements for FeMBMS, consisting of 2 pages.
3GPP TSG-RAN WG1 #87, Reno, USA, Nov. 14-18, 2016; R1-1613758; Release 14; Source: TSG RAN WG1; To: TSG RAN WG2; Work Item: MBMS_LTE_enh2-Core; Title: LS Regarding RAN1 Agreements on FeMBMS, consisting of 2 pages.
Indian Examination Report dated Dec. 31, 2020, issued in Indian Patent Application No. 201917033248; consisting of 6 pages.
R1-1609505; 3GPP TSG RAN WG1 Meeting #86b; Intel Corporation Capability to support multiple numerologies; Lisbon, Portugal, Oct. 10-14, 2016; consisting of 4 pages.
R1-1611655; 3GPP TSG RAN WG1 Meeting #87; Huawei, HiSilicon Mechanisms of bandwidth adaptation for control and data reception in single-carrier and multi-carrier cases; Reno, USA, Nov. 14-18, 2016; consisting of 4 pages.
R1-1613162; TSG-RAN WG1 #87; Ericsson Summary of e-mail discussions on uplink collrol signaling; Reno, NV, USA, Nov. 14-18, 2016; consisting of 4 pages.
R1-1609051; 3GPP TSG RAN WG1 Meeting #86bis; Samsung Consideration on UE capability to process multiple numerologies; Lisbon, Portugal, Oct. 10-14, 2016; consisting of 3 pages.
R1-1608964; 3GPP TSG RAN WG1 Meeting #86bis; ZTE, ZTE Microelectronics About Slot structure and Scheduling Units for NR; Lisbon, Portugal, Oct. 10 -14, 2016; consisting of 8 pages.
R1-167127; 3GPP TSG RAN WG1 Meeting #86; Intel Corporation Frame structure considerations for URLLC Gothenburg, Sweden Aug. 22-26, 2016; consisting of 10 pages.
R1-1713758; 3GPP TSG RAN WG1 Meeting #90; Huawei, HiSilicon A holistic procedure for beam failure recovery Prague, Czech Republic, Aug. 21-25, 2017; consisting of 7 pages.
R1-1613490; 3GPP TSG-RAN WG1 #87; Intel Corporation LS regarding RAN1 agreements on FeMBMS; Reno, NV, USA Nov. 14-18, 2016; consisting of 2 pages.
R4-1701707; 3GPP TSG-RAN4 Meeting #82; Ericsson Overview of UE RF work for eMBMS enhancements; Athens, Greece, Feb. 13-17, 2017; consisting of 2 pages.
R1-167110; 3GPP TSG-RAN WG1 Meeting #86; CMCC Discussion on Time Interval and TTI for NR; Gothenburg, Sweden Aug. 22-26, 2016; consisting of 7 pages.
Taiwan Office Action and english translation dated Oct. 9, 2018, issued in Patent Application No. 107103565; consisting of 31 pages.
Taiwan Office Action and english translation dated Mar. 26, 2019, issued in Patent Application No. 107103565; consisting of 13 pages.

* cited by examiner

APPARATUSES AND METHODS OF SWITCHING BETWEEN DIFFERENT NUMEROLOGIES

CROSS-REFERENCE TO RELATED APPLICATIONS

This application is a Submission Under 35 U.S.C. § 371 for U.S. National Stage Patent Application of International Application No.: PCT/IB2017/058286, filed Dec. 21, 2017 entitled "APPARATUSES AND METHODS OF SWITCHING BETWEEN DIFFERENT NUMEROLOGIES," which claims priority to U.S. Provisional Application No. 62/453,777, filed Feb. 2, 2017, entitled "METHODS OF SWITCHING BETWEEN DIFFERENT NUMEROLOGIES," the entireties of both of which are incorporated herein by reference.

TECHNICAL FIELD

Wireless communication and in particular, to a method, wireless device and network node configured to switch between different numerologies based on a first node's switching capability.

BACKGROUND

Multimedia Broadcast Multicast Services

In wireless communications, there are occasions where the data originating from one node is intended for multiple users. These services are called "broadcasting" or "multicasting" and the most well-known examples are television and radio broadcasting. Cellular standard Evolved Universal Terrestrial Radio Access (E-UTRA), which is the air interface of Long Term Evolution (LTE), has a support service for multicasting called Multimedia Broadcast Multicast Services (MBMS).

In MBMS, the data is transmitted to all users that are in the same MBMS service area, which typically includes several cells, and each of the network nodes in the MBMS area transmits the data in its own cell area. If the transmissions are time synchronized, the received signal at the user terminal appears as the transmission of a single point over a time-dispersive channel. In LTE, this type of transmission is called MBMS Single Frequency Network (MBSFN). The advantages of MBSFN include increased received signal strength, reduced interference at the borders of the cells within the same MBSFN area, and additional diversity due to receiving from multiple nodes.

The transport channel for multicast is called multicast channel (MCH), which includes two logical channels: Multicast Traffic Channel (MTCH), and Multicast Control Channel (MCCH). As the names suggest, MTCH carries MBMS data while MCCH carries control information. The MCH is mapped to a Physical Multicast Channel (PMCH), which is then transmitted in MBSFN subframes. FIG. 1 illustrates an example of MBSFN channel mapping across logical, transport and physical channels.

The MBMS can be provided on a MBMS dedicated carrier frequency or on a shared carrier frequency (i.e., shared between MBMS and unicast, in other words, sharing a carrier frequency between both MBSFN subframes and non-MBSFN subframes). In the former scenario (an MBMS dedicated carrier frequency), all subframes can be used for MBMS signal transmission. In the latter scenario (shared carrier frequency), the MBMS is shared with unicast (i.e., non-MBSFN subframes) service in a time division multiplex manner, i.e., different subframes within a radio frame are used for MBMS and unicast services. The MBMS subframes are configurable by the network node. The information regarding which subframes are configured for MBMS in a cell is signaled by the network node. Examples of subframes which can be configured for MBMS, i.e., as MBSFN subframes, are subframes numbers 1, 2, 3, 6, 7 and 8 for LTE Frequency Division Duplex (FDD) and subframe numbers 3, 4, 7, 8 and 9 for LTE Time Division Duplex (TDD). This means subframe number 0 and subframe number 5 are always unicast subframes in both FDD and TDD. In addition, in the case of LTE FDD, the subframe numbers 4 and 9 and in the case of LTE TDD, subframe numbers 1, 2 and 6 are also unicast subframes. The unicast subframes are used only for unicast services.

MBSFN subframe includes a control region in the beginning and an MBSFN region used for transmission of MCH. The control region has a length of one or two Orthogonal Frequency-Division Multiplexing (OFDM) symbols using, for example, a 4.7 μs cyclic prefix length, and an MBSFN region that, depending on the content, can have different structures.

The physical layer of the MBSFN signal is based on OFDM with 15 kHz subcarrier spacing with extended cyclic prefix16.7 μs (in shared mode, also known as, mixed mode), or 7.5 kHz subcarrier spacing with long cyclic prefix 33.3 μs (in dedicated mode).

A base station such as an evolved Node B (eNB) is configured with MBMS scheduling information by a network entity called Multi-cell/Multicast Coordination Entity (MCE). The MCE may be a separate network node or may reside in an eNB. The MCE and the eNB communicate over an M2 interface. The M2 interface is a logical interface between the eNB and the MCE.

Evolved Multimedia Broadcast Multicast Service Enhancements

In Rel-14 Evolved Universal Terrestrial Radio Access (E-UTRA), further enhancements are introduced for more efficient use of MBMS in large inter-site distance scenarios. It has been agreed that a new symbol length of 800 μs with a Cycle Prefix (CP) length of 200 μs to be adopted in Rel-14 evolved Multimedia Broadcast Multicast Service (eMBMS). For both the new 1.25 kHz subcarrier spacing numerology and the 7.5 kHz subcarrier spacing, a wireless device, such as a User Equipment (UE) can assume that the unicast control region is never present in the MBSFN subframe. For a dedicated mode, supporting 15, 7.5 and 1.25 kHz numerologies, System Information (SI) is broadcasted in a Cell Acquisition Subframe (CAS) based on discovery of a reference signal with fixed periodicity of 40 ms.

For mixed mode, supporting 15 and 1.25 kHz numerologies (it is likely that 7.5 kHz will be also added), SI is provided in subframes that have unicast control region. Such a mode of operation means using an increased number of MBSFN subframes (subframes 0 and 5 will be always non-MBSFN and cells will be configured as a Secondary Cell (SCell) if subframes 4 and 9 are configured as MBSFN subframes).

New Radio

New radio (NR) that is currently being studied in 3rd Generation Partnership Project (3GPP) can support multiple subcarrier spacing. Currently, the support of subcarrier spacing equal to 2n×15 kHz is being considered, where n can be negative or positive integers. Examples of n are −2, −1, 1, 2, 3, 4, etc. Examples of subcarrier spacing which may be used in NR are 3.75 kHz, 7.5 kHz, 15 kHz, 30 kHz, 60 kHz, 120 kHz, 240 kHz, 480 kHz, etc. Also, mixed numerologies (Δf1, Δf2) frequency-multiplexed on same carrier is supported, as shown in FIG. 2.

One possible scenario for the NR with mixed numerologies is that for a certain period of time, one numerology is used, e.g., Δf1, but due to changes in the application, environment, etc., after some time the communication is performed with a different subcarrier spacing, i.e., Δf2.

Due to physical attributes of devices such as rise and fall times (also known as, "transient times," "ramp up/down times," etc.) in electronic switches, etc., there are certain limits as to how fast the switching can be done between numerologies. In a cellular network with network nodes and terminals of different limitations and capabilities, it is unclear how the switching between numerologies can be implemented. In addition to what kind of node is supposed to perform the operation, different problems may arise according to whether it is the switching in the transmitter or the receiver side. Another problem is switching between different operation modes, i.e., unicast and multicast, where there may be different numerologies used.

The switching between different numerologies also requires trade-off between capacity optimization and assurance of performance. If the switching of numerology is, for example, triggered just by a change of channel conditions requiring longer CP (usually implying also lower subcarrier spacing and higher data rate per symbol), then adaptation of application rate and symbol rate is needed and may result in capacity loss. Further, it needs to be considered that a transmission gap may be required if the new numerology parameters do not fit properly with standard slot and subframe structures, and also between symbols with different cyclic prefix when numerologies are multiplexed in the same radio resource (slot or subframe) in order to ensure that an integer number of symbols fit one slot or one subframe. For example, a transmission gap lies between the control region and data region of an eMBMS subframe. A gap is present in the Narrow Band-Internet of Things (NB-IoT) slot when a 3.75 kHz subcarrier spacing is adopted, where 7 OFDM symbols cover 1925 μs out of a 2 ms slot length.

SUMMARY

Some embodiments advantageously provide a method and apparatus for switching between different numerologies based on switching capabilities of at least one network node.

The disclosure includes several embodiments related to the wireless device, the network node and methods in the wireless device and the network node as described herein.

According to one aspect, a method in a network node for switching between different numerologies supported by the network node is provided. The method includes determining at least one parameter that can be used by the network node for switching between a first signal operating with a first numerology and a second signal operating with a second numerology; switching between the first signal and the second signal based on the at least one parameter; and after the switching, operating at least one of the first signal and the second signal between the network node and a second node.

According to this aspect, in some embodiments, the at least one parameter includes an interruption time due to switching. In some embodiments, the at least one parameter includes a predefined value corresponding to a maximum allowed interruption time due to switching. In some embodiments, the at least one parameter includes at least one of numerology switching delay time, frequency of switching between numerologies, specific time resources allowed for switching, time resources restricted for switching, numerologies allowed for switching, and part of a spectrum allowed for switching. In some embodiments, the first numerology is a first subcarrier spacing and the second numerology is a second subcarrier spacing, the second subcarrier spacing being different from the first subcarrier spacing. In some embodiments, the method further includes restricting scheduling of at least one of a downlink and an uplink transmission in at least one subframe adjacent a multicast having a different numerology. In some embodiments, operating the at least one of the first signal and the second signal between the network node and the second node comprises at least one of transmitting the at least one of the first signal and the second signal to the second node and receiving the at least one of the first signal and the second signal from the second node. In some embodiments, the second node is a wireless device. In some embodiments, the method includes receiving from at least one of the second node and another node information regarding the at least one parameter; and switching between the first signal and the second signal based on the at least one parameter includes switching between the first signal and the second signal based at least upon the received information regarding the at least one parameter. In some embodiments, switching between the first signal and the second signal is further based on a numerology supported by the second node. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to another aspect, a network node configured to switch between different numerologies supported by the network node is provided. The network node includes processing circuitry configured to: determine at least one parameter that can be used by the network node for switching between a first signal operating with a first numerology and a second signal operating with a second numerology; switch between the first signal and the second signal based on the at least one parameter; and after the switching, operate at least one of the first signal and the second signal between the network node and a second node.

According to this aspect, in some embodiments, the at least one parameter includes an interruption time due to switching. In some embodiments, the at least one parameter includes a predefined value corresponding to a maximum allowed interruption time due to switching. In some embodiments, the at least one parameter includes at least one of numerology switching delay time, frequency of switching between numerologies, specific time resources allowed for switching, time resources restricted for switching, numerologies allowed for switching, and part of a spectrum allowed for switching. In some embodiments, the first numerology is a first subcarrier spacing and the second numerology is a second subcarrier spacing, the second subcarrier spacing being different from the first subcarrier spacing. In some embodiments, the processing circuitry is further configured to restrict scheduling of at least one of a downlink and an uplink transmission in at least one subframe adjacent a multicast having a different numerology. In some embodiments, the network node includes a communications interface in communication with the processing circuitry, the processing circuitry configured to operate the at least one of the first signal and the second signal between the network node and the second node by at least one of causing the communications interface to transmit the at least one of the first signal and the second signal to the second node and causing the communications interface to receive the at least one of the first signal and the second signal from the second node. In some embodiments, the second node is a wireless device. In some embodiments, the network node further includes a communications interface in communication with the processing circuitry, the processing circuitry configured to cause the communications interface to receive from at least one of the second node and another node information regarding the at least one parameter; and switch between the first signal and the second signal based at least upon the received information regarding the at least one parameter. In some embodiments, the processing circuitry is further configured to switch between the first signal and the second signal based on a numerology supported by the second node. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to yet another aspect, a method in a wireless device for switching between different numerologies supported by the wireless device is provided. The method includes determining at least one parameter that can be used by the wireless device for switching between a first signal operating with a first numerology and a second signal operating with a second numerology; switching between the first signal and the second signal based on the at least one parameter; and after the switching, operating at least one of the first signal and the second signal between the wireless device and a second node.

According to this aspect, in some embodiments, the at least one parameter includes an interruption time due to switching. In some embodiments, the at least one parameter includes a predefined value corresponding to a maximum allowed interruption time due to switching. In some embodiments, the at least one parameter includes at least one of numerology switching delay time, frequency of switching between numerologies, specific time resources allowed for switching, time resources restricted for switching, numerologies allowed for switching, and part of a spectrum allowed for switching. In some embodiments, the first numerology is a first subcarrier spacing and the second numerology is a second subcarrier spacing, the second subcarrier spacing being different from the first subcarrier spacing. In some embodiments, the method further includes restricting scheduling of at least one of a downlink and an uplink transmission in at least one subframe adjacent a multicast having a different numerology. In some embodiments, operating the at least one of the first signal and the second signal between the network node and the second node comprises at least one of transmitting the at least one of the first signal and the second signal to the second node and receiving the at least one of the first signal and the second signal from the second node. In some embodiments, the second node is one of a second wireless device and a network node. In some embodiments, the method further includes receiving from at least one of the second node and another node information regarding the at least one parameter; and switching between the first signal and the second signal based on the at least one parameter includes switching between the first signal and the second signal based at least upon the received information regarding the at least one parameter. In some embodiments, switching between the first signal and the second signal is further based on a numerology supported by the second node. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to another aspect, a wireless device configured to switch between different numerologies supported by the wireless device is provided. The wireless device includes processing circuitry configured to determine at least one parameter that can be used by the network node for switching between a first signal operating with a first numerology and a second signal operating with a second numerology; switch between the first signal and the second signal based on the at least one parameter; and after the switching, operate at least one of the first signal and the second signal between the network node and a second node.

According to this aspect, in some embodiments, the at least one parameter includes an interruption time due to switching. In some embodiments, the at least one parameter includes a predefined value corresponding to a maximum allowed interruption time due to switching. In some embodiments, the at least one parameter includes at least one of numerology switching delay time, frequency of switching between numerologies, specific time resources allowed for switching, time resources restricted for switching, numerologies allowed for switching, and part of a spectrum allowed for switching. In some embodiments, the first numerology is a first subcarrier spacing and the second numerology is a second subcarrier spacing, the second subcarrier spacing being different from the first subcarrier spacing. In some embodiments, the processing circuitry is further configured to restrict scheduling of at least one of a downlink and an uplink transmission in at least one subframe adjacent a multicast having a different numerology. In some embodiments, the wireless device includes a communications interface in communication with the processing circuitry, the processing circuitry configured to operate the at least one of the first signal and the second signal between the network node and the second node by at least one of causing the communications interface to transmit the at least one of the first signal and the second signal to the second node and causing the communications interface to receive the at least one of the first signal and the second signal from the second node. In some embodiments, the second node is one of a second wireless device and a network node. In some embodiments, the wireless device includes a communications interface in communication with the processing circuitry, the processing circuitry configured to: cause the communications interface to receive from at least one of the second node and another node information regarding the at least one parameter; and switch between the first signal and the second signal based at least upon the received information regarding the at least one parameter. In some embodiments, the processing circuitry is further configured to switch between the first signal and the second signal based on a numerology supported by the second node. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to another aspect, a method in a network node for switching between different numerologies supported by the network node and a second node is provided. The method includes determining at least one first parameter used by the network node for switching between a first signal operating with a first numerology and a second signal operating with a second numerology; determining at least one second parameter used by the second node for switching between the first signal operating with the first numerology and the second signal operating with the second numerology; determining a third parameter that is a function of at least one of the at least one first parameter and the at least one second parameter; and using the third parameter for at least one operational task.

According to this aspect, in some embodiments, the at least one of the at least one first parameter and the at least one second parameter includes an interruption time due to switching. In some embodiments, the at least one of the at least one first parameter and the at least one second parameter includes a predefined value corresponding to a maximum allowed interruption time due to switching. In some embodiments, a value of the at least one first parameter is the same as a value of the at least one second parameter. In some embodiments, a value of the at least one first parameter is different than a value of the at least one second parameter.

According to this aspect, in some embodiments, the at least one second parameter includes a parameter that is determined based on at least one of predefined information, receiving information about the at least one second parameter associated with the second node from another node, at least one of statistics and historical data, and feedback from the second node. In some embodiments, the at least one operational task includes at least one of configuring the second node with information related to a determined value of the third parameter, transmitting information related to the determined value of the third parameter, using the information related to the determined value of the third parameter for scheduling of signals exchanged with the second node, and performing switching between the first signal and the second signal based on the determined value of the third parameter. In some embodiments, the at least one operational task comprises at least one of transmitting the at least one of the first signal and the second signal to the second node and receiving the at least one of the first signal and the second signal from the second node. In some embodiments, the second node is a wireless device. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to one aspect, a network node configured to switch between different numerologies supported by the network node and a second node is provided. The network node includes processing circuitry configured to: determine at least one first parameter used by the network node for switching between a first signal operating with a first numerology and a second signal operating with a second numerology; determine at least one second parameter used by the second node for switching between the first signal operating with the first numerology and the second signal operating with the second numerology; determine a third parameter that is a function of at least one of the at least one first parameter and the at least one second parameter; and use the third parameter for at least one operational task.

According to this aspect, in some embodiments, the at least one of the at least one first parameter and the at least one second parameter includes an interruption time due to switching. In some embodiments, the at least one of the at least one first parameter and the at least one second parameter includes a predefined value corresponding to a maximum allowed interruption time due to switching. In some embodiments, a value of the at least one first parameter is the same as a value of the at least one second parameter. In some embodiments, a value of the at least one first parameter is different than a value of the at least one second parameter. In some embodiments, the at least one second parameter includes a parameter determined based on at least one of predefined information, receiving information about the at least one second parameter associated with the second node from another node, at least one of statistics and historical data, and feedback from the second node. In some embodiments, the at least one operational task includes at least one of configuring the second node with information related to a determined value of the third parameter, transmitting information related to the determined value of the third parameter, using the information related to the determined value of the third parameter for scheduling of signals exchanged with the second node, and performing switching between the first signal and the second signal based on the determined value of the third parameter. In some embodiments, the at least one operational task comprises at least one of transmitting the at least one of the first signal and the second signal to the second node and receiving the at least one of the first signal and the second signal from the second node. In some embodiments, the second node is a wireless device. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to another aspect, a method in a wireless device for switching between different numerologies supported by the wireless device and a second node is provided. The method includes determining at least one first parameter used by the wireless device for switching between a first signal operating with a first numerology and a second signal operating with a second numerology; determining at least one second parameter used by the second node for switching between the first signal operating with the first numerology and the second signal operating with the second numerology; determining a third parameter that is a function of at least one of the at least one first parameter and the at least one second parameter; and using the third parameter for at least one operational task.

According to this aspect, in some embodiments, the at least one of the at least one first parameter and the at least one second parameter includes an interruption time due to switching. In some embodiments, the at least one of the at least one first parameter and the at least one second parameter includes a predefined value corresponding to a maximum allowed interruption time due to switching. In some embodiments, a value of the at least one first parameter is the same as a value of the at least one second parameter. In some embodiments, a value of the at least one first parameter is different than a value of the at least one second parameter. In some embodiments, the at least one second parameter includes a parameter that is determined based on at least one of predefined information, receiving information about the at least one second parameter associated with the second node from another node, at least one of statistics and historical data, and feedback from the second node. In some embodiments, the at least one operational task includes at least one of configuring the second node with information related to a determined value of the third parameter, transmitting information related to the determined value of the third parameter, using the information related to the determined value of the third parameter for scheduling of signals exchanged with the second node, and performing switching between the first signal and the second signal based on the determined value of the third parameter. In some embodiments, the at least one operational task includes at least one of transmitting the at least one of the first signal and the second signal to the second node and receiving the at least one of the first signal and the second signal from the second node. In some embodiments, the second node is a second wireless device. In some embodiments, the second node is a network node. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to one aspect, a wireless device configured to switch between different numerologies supported by the wireless device and a second node is provided. The wireless device includes processing circuitry configured to: determine at least one first parameter used by the wireless device for switching between a first signal operating with a first numerology and a second signal operating with a second numerology; determine at least one second parameter used by the second node for switching between the first signal operating with the first numerology and the second signal operating with the second numerology; determine a third parameter that is a function of at least one of the at least one first parameter and the at least one second parameter; and use the third parameter for at least one operational task.

According to this aspect, in some embodiments, at least one of the at least one first parameter and the at least one second parameter includes an interruption time due to switching. In some embodiments, the at least one of the at least one first parameter and the at least one second parameter includes a predefined value corresponding to a maximum allowed interruption time due to switching. In some embodiments, a value of the at least one first parameter is the same as a value of the at least one second parameter. In some embodiments, a value of the at least one first parameter is different than a value of the at least one second parameter. In some embodiments, the at least one second parameter is determined based on at least one of predefined information, receiving information about the at least one second parameter associated with the second node from another node, at least one of statistics and historical data, and feedback from the second node. In some embodiments, the at least one operational task includes at least one of configuring the second node with information related to a determined value of the third parameter, transmitting information related to the determined value of the third parameter, using the information related to the determined value of the third parameter for scheduling of signals exchanged with the second node, and performing switching between the first signal and the second signal based on the determined value of the third parameter. In some embodiments, the at least one operational task comprises at least one of transmitting the at least one of the first signal and the second signal to the second node and receiving the at least one of the first signal and the second signal from the second node. In some embodiments, the second node is a second wireless device. In some embodiments, the second node is a network node. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to another aspect, a method in a network node for switching between different numerologies supported by the network node and another node is provided. The method includes receiving from the other node information regarding at least one first parameter to be used by the network node for switching between a first signal operating with a first numerology and a second signal operating with a second numerology; switching between the first signal and the second signal based at least upon the received information regarding the at least one first parameter; and after the switching, operating at least one of the first signal and the second signal between the network node and the other node.

According to this aspect, in some embodiments, the at least one first parameter includes an interruption time due to switching. In some embodiments, the at least one first parameter includes a predefined value corresponding to a maximum allowed interruption time due to switching. In some embodiments, the method further includes transmitting to the other node information regarding at least one second parameter used by the network node for switching between the first signal operating with the first numerology and the second signal operating with the second numerology. In some embodiments, the information regarding the at least one second parameter used by the network node transmitted to the other node is transmitted in response to receiving a request by the other node. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to another aspect, a network node configured to switch between different numerologies supported by the network node and another node is provided. The network node includes a communications interface configured to: receive from the other node information regarding at least one first parameter to be used by the network node for switching between a first signal operating with a first numerology and a second signal operating with a second numerology; and processing circuitry configured to: switch between the first signal and the second signal based at least upon the received information regarding the at least one first parameter; and after the switching, operate at least one of the first signal and the second signal between the network node and the other node.

According to this aspect, in some embodiments, the at least one first parameter includes an interruption time due to switching. In some embodiments, the at least one first parameter includes a predefined value corresponding to a maximum allowed interruption time due to switching. In some embodiments, the communications interface is further configured to: transmit to the other node information regarding at least one second parameter used by the network node for switching between the first signal operating with the first numerology and the second signal operating with the second numerology. In some embodiments, the information regarding the at least one second parameter used by the network node transmitted to the other node is transmitted in response to receiving a request by the other node. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to another aspect, a method in a wireless device for switching between different numerologies supported by the wireless device and another node is provided. The method includes receiving from the other node information regarding at least one first parameter to be used by the wireless device for switching between a first signal operating with a first numerology and a second signal operating with a second numerology; switching between the first signal and the second signal based at least upon the received information regarding the at least one first parameter; and after the switching, operating at least one of the first signal and the second signal between the wireless device and the other node.

According to this aspect, in some embodiments, the at least one first parameter includes an interruption time due to switching. In some embodiments, the at least one first parameter includes a predefined value corresponding to a maximum allowed interruption time due to switching. In some embodiments, the method further includes transmitting to the other node information regarding at least one second parameter used by the wireless device for switching between the first signal operating with the first numerology and the second signal operating with the second numerology. In some embodiments, the information regarding the at least one second parameter used by the wireless device transmitted to the other node is transmitted in response to receiving a request by the other node. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to another aspect, a wireless device configured to switch between different numerologies supported by the wireless device and another node is provided. The wireless device includes a communications interface configured to: receive from the other node information regarding at least one first parameter to be used by the wireless device for switching between a first signal operating with a first numerology and a second signal operating with a second numerology; and processing circuitry configured to: switch between the first signal and the second signal based at least upon the received information regarding the at least one first parameter; and after the switching, operate at least one of the first signal and the second signal between the wireless device and the other node.

According to this aspect, in some embodiments, the at least one first parameter includes an interruption time due to switching. In some embodiments, the at least one first parameter includes a predefined value corresponding to a maximum allowed interruption time due to switching. In some embodiments, the communications interface is further configured to transmit to the other node information regarding at least one second parameter used by the wireless device for switching between the first signal operating with the first numerology and the second signal operating with the second numerology. In some embodiments, the information regarding the at least one second parameter used by the wireless device transmitted to the other node is transmitted in response to receiving a request by the other node. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to another aspect, a network node configured to switch between different numerologies supported by the network node is provided. The network node includes a parameter determination module configured to determine at least one parameter that can be used by the network node for switching between a first signal operating with a first numerology and a second signal operating with a second numerology; a signal switching module configured to switch between the first signal and the second signal based on the at least one parameter; and a signal operation module configured to after the switching, operate at least one of the first signal and the second signal between the network node and a second node.

According to another aspect, a wireless device configured to switch between different numerologies supported by the wireless device is provided. The wireless device includes a parameter determination module configured to determine at least one parameter that can be used by the wireless device for switching between a first signal operating with a first numerology and a second signal operating with a second numerology; a signal switching module configured to switch between the first signal and the second signal based on the at least one parameter; and a signal operation module configured to, after the switching, operate at least one of the first signal and the second signal between the wireless device and a second node.

According to yet another aspect, a network node configured to switch between different numerologies supported by the network node is provided. The network node includes a parameter determination module configured to: determine at least one first parameter used by the network node for switching between a first signal operating with a first numerology and a second signal operating with a second numerology; determine at least one second parameter used by the second node for switching between the first signal operating with the first numerology and the second signal operating with the second numerology; and determine a third parameter that is a function of at least one of the at least one first parameter and the at least one second parameter; and a parameter implementation module configured to use the third parameter for at least one operational task.

According to yet another aspect, a wireless device configured to switch between different numerologies supported by the wireless device is provided. The wireless device includes a parameter determination module configured to: determine at least one first parameter used by the wireless device for switching between a first signal operating with a first numerology and a second signal operating with a second numerology; determine at least one second parameter used by the second node for switching between the first signal operating with the first numerology and the second signal operating with the second numerology; and determine a third parameter that is a function of at least one of the at least one first parameter and the at least one second parameter; and a parameter implementation module configured to use the third parameter for at least one operational task.

According to another aspect, a network node configured to switch between different numerologies supported by the network node and another node is provided. The network node includes a communications interface module configured to receive from the other node information regarding at least one first parameter to be used by the network node for switching between a first signal operating with a first numerology and a second signal operating with a second numerology; a signal switching module configured to switch between the first signal and the second signal based at least upon the received information regarding the at least one first parameter; and a signal operation module configured to, after the switching, operate at least one of the first signal and the second signal between the network node and the other node.

According to another aspect, a wireless device configured to switch between different numerologies supported by the wireless device and another node is provided. The wireless device includes a communications interface module configured to receive from the other node information regarding at least one first parameter to be used by the wireless device for switching between a first signal operating with a first numerology and a second signal operating with a second numerology; a signal switching module configured to switch between the first signal and the second signal based at least upon the received information regarding the at least one first parameter; and a signal operation module configured to, after the switching, operate at least one of the first signal and the second signal between the wireless device and the other node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
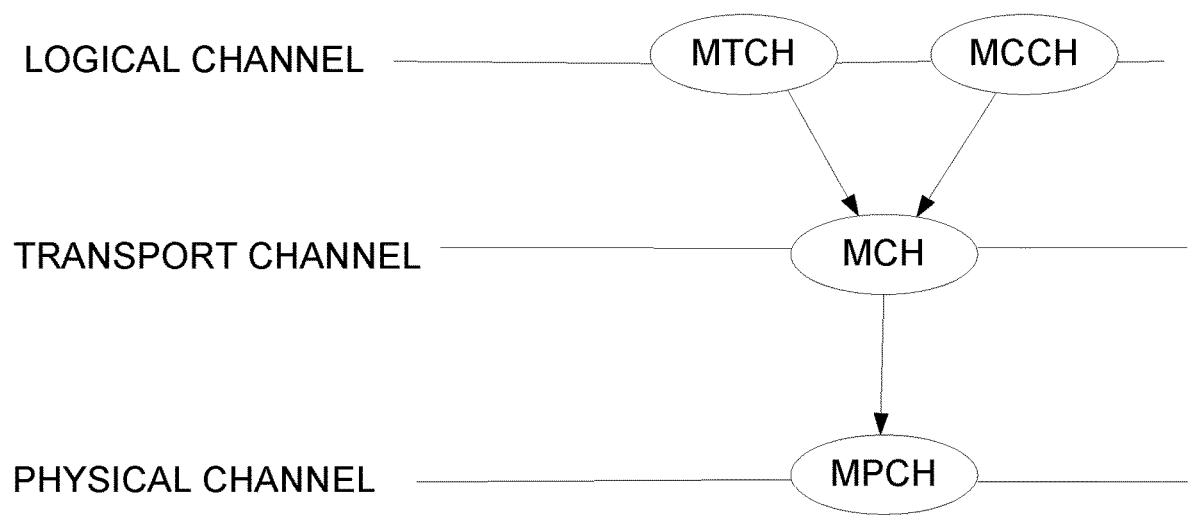
FIG. 1 is a block diagram of an existing configuration showing MBSFN channel mapping.
Figure 2:
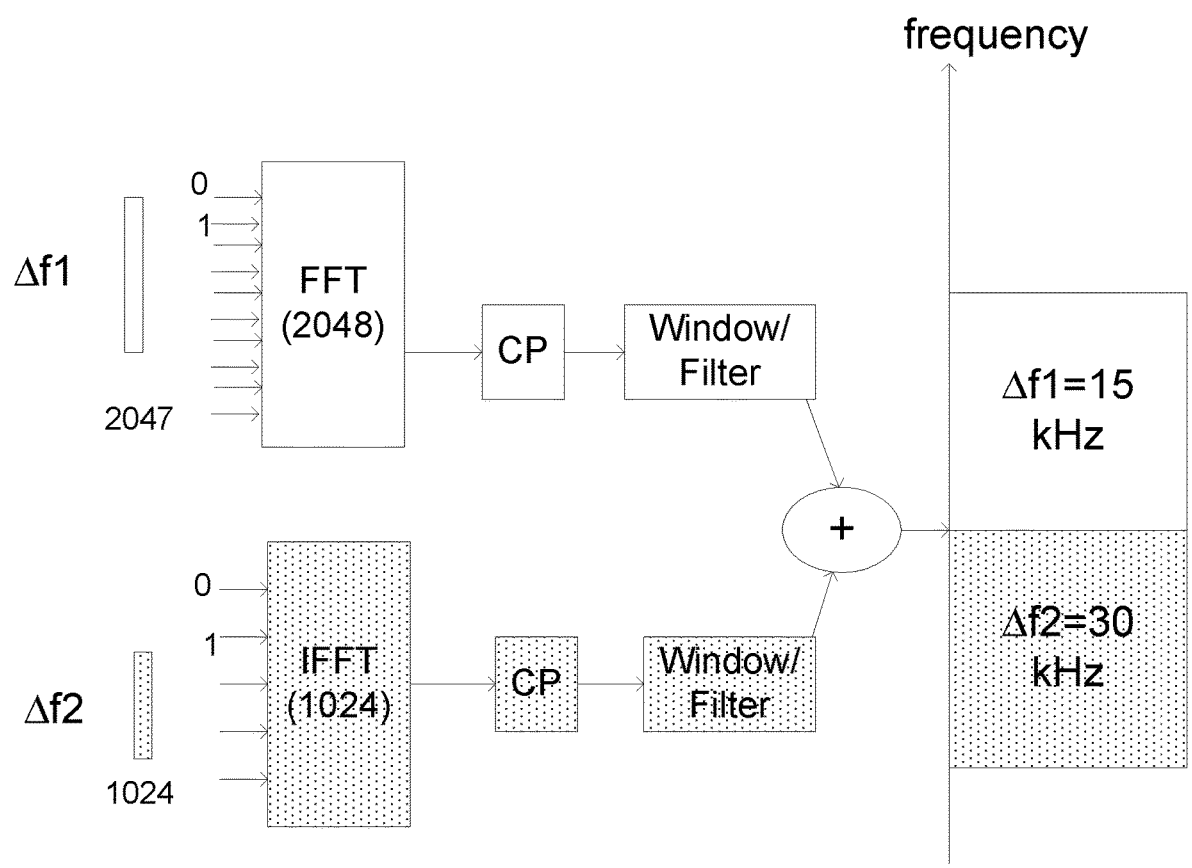
FIG. 2 is a block diagram of an existing New Radio configuration with mixed numerologies.

Before describing in detail exemplary embodiments, it is noted that the embodiments reside primarily in combinations of apparatus components and processing steps related to switching numerologies. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Before describing the details of the disclosure, some generalizations are described. In some embodiments the term "network node" is used. Note that terminology such as base station, 5th Generation (5G) base station, NR base station, NodeB, gNode B or eNode B and user equipment (UE) should be considering non-limiting and does in particular not imply a certain hierarchical relation between the two; in general, "NodeB" could be considered as device 1 and "UE" device 2, and these two devices communicate with each other over some radio channel.

An example of a network node could be a more general term and can correspond to any type of radio network node or any network node, which communicates with a wireless device and/or with another network node. Examples of network nodes are NodeB, base station (BS), multi-standard radio (MSR) radio node such as MSR BS, eNodeB, gNodeB, Master evolved Node B (MeNB), Secondary evolved Node B (SeNB), transmission reception point (TRP), network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g., Mobile Switching Center (MSC), Mobility Management Entity (MME), etc.), Operation and Maintenance (O&M), Operation Support Systems (OSS), Self-Organizing Networks (SON), positioning node (e.g., Evolved Serving Mobile Location Center (E-SMLC), Mobile Data Terminal (MDT) node, Multi-cell/Multicast Coordination Entity (MCE), MBMS node, etc.

In some embodiments, generic terminology, "radio network node" or simply "network node (NW node)" is used. It can be any kind of network node which may include base station, radio base station, base transceiver station, base station controller, network controller, evolved Node B (eNB), Node B, relay node, access point, radio access point, Remote Radio Unit (RRU) Remote Radio Head (RRH), etc.

A non-limiting term "wireless device" is used herein and it refers to any type of wireless device communicating with a network node and/or with another wireless device in a cellular or mobile communication system. Examples of wireless devices are user equipment (UE) such as an LTE UE, a Narrow Band-Internet of Things (NB-IoT) UE, a Vehicle-to-Vehicle (V2V) UE, a Vehicle-to-anything (V2X) UE, a UE of a particular category (e.g., UE category NB1, UE category M1, UE category 0, etc.), target device, device to device (D2D) wireless device, machine type wireless device or wireless device capable of machine to machine (M2M) communication, Personal Digital Assistant (PDA), Tablet, mobile terminals, smart phone, laptop embedded equipped (LEE), laptop mounted equipment (LME), Universal Serial Bus (USB) dongles, etc.

The term radio access technology, or RAT, may refer to any RAT, e.g., Universal Terrestrial Radio Access (UTRA), Evolved Universal Terrestrial Radio Access (E-UTRA), NB-IoT, WiFi, Bluetooth, next generation RAT (NR), 4G, 5G, etc. Any of the first and the second nodes may be capable of supporting a single or multiple RATs.

In some embodiments, the term operating bandwidth (BW) is used. Over the operating BW, the network node transmits to and/or receives signal from one or more wireless devices in a cell. The operating bandwidth can be interchangeably called channel bandwidth, system bandwidth, transmission bandwidth, cell bandwidth, cell transmission BW, carrier bandwidth etc. The operating BW may be expressed in different units. Examples of units are kHz, MHz, number of resource blocks, number of resource elements, number of subcarriers, number of physical channels, number of frequency resource units, etc. The frequency channel or carrier frequency over which a RAT operates is enumerated or addressed by a channel number, also known as, Absolute Radio Frequency Channel Number (ARFCN), e.g., E-UTRA ARFCN (EARFCN) in LTE, etc.

In some embodiments, the signal used can be an uplink (UL) signal, a downlink (DL) signal or a sidelink (SL) signal. An uplink signal, which is transmitted by the wireless device, can be a physical signal or a physical channel. Examples of uplink physical signals are Sounding Reference Signal (SRS), Demodulation Reference Signal (DMRS), etc. Examples of uplink physical channels are Physical Uplink Control Channel (PUCCH), Physical Uplink Shared Channel (PUSCH), Narrowband Physical Uplink Shared Channel (NPUSCH), Narrowband Physical Uplink Control Channel (NPUCCH), Physical Random Access Channel (PRACH), NB-IoT Physical Random Access Channel (NPRACH), etc. A DL signal, which is transmitted by the network node, can be a physical signal or a physical channel. Examples of DL physical signals are Cell Specific Reference Signal (CRS), Demodulation Reference Signal (DMRS), Positioning Reference Signal (PRS), Channel State Information-Reference Signal (CSI-RS), etc. Examples of downlink physical channels are Physical Downlink Control Channel (PDCCH), Physical Downlink Shared Channel (PDSCH), Narrowband Physical Downlink Shared Channel (NPDSCH), Narrowband Physical Downlink Control Channel (NPDCCH), Physical Multicast Channel (PMCH), etc. In some embodiments, the signal includes MBSFN subframes, as in the case of PMCH and/or non-MBSFN subframes, as in the case of, for example, unicast transmissions. A sidelink (SL) signal, which is transmitted by a wireless device capable of direct wireless device to wireless device operation (also known as D2D operation, V2V operation, etc.), can be a physical signal or a physical channel. Examples of SL physical signals are Sidelink Synchronization Signal (SLSS), DMRS, etc. Examples of SL physical channels are Physical Sidelink Shared Channel (PSSCH), Physical Sidelink Control Channel (PSCCH), Physical Sidelink Discovery Channel (PSDCH), Physical Sidelink Broadcast Channel (PSBCH), etc.

The term "numerology" used herein may refer to any one or more attributes defining signal characteristics. Examples of such attributes are: subcarrier spacing, symbol duration, CP duration (also known as CP length), time slot duration, subframe duration, number of subcarriers per physical channel, number of physical channels within the bandwidth, etc. A physical channel used herein refers to any time-frequency radio resource. Examples of physical channels are resource block (RB), physical RB (PRB), virtual RB (VRB), etc.

The term "switching of numerology" may refer to switching between one numerology (e.g., a first numerology, N1) and another numerology (e.g., a second numerology, N2). The switching may occur from N1 to N2 or from N2 to N1. The switching of numerology may also interchangeably be called numerology switching, switching between numerologies, modification of numerology, change of numerology, etc. Signals S1 and S2 operate using N1 an N2, respectively. Therefore, the change in the numerology also means a change in the signal, e.g., from S1 to S2 if N1 is changed to N2. The change of numerology requires change in or modification of at least one attribute or parameter defining numerology, e.g., subcarrier spacing, CP length, etc. For example, change in the subcarrier spacing from 15 kHz to 60 kHz is considered to be "numerology switching" or more specifically "subcarrier spacing switching" (or switching between subcarrier spacings).

The numerology switching at a node (e.g., either a network node or a wireless device), which performs the numerology switching, is initiated or triggered by a message or command received at the node. Of note, the term "node" as used herein may apply to a network node or a wireless device. The message may be received internally at the lower layers (e.g., physical layer) of the node which performs the switching. The message may be received from the node's higher layers, which in turn may be triggered by one or more of the following means: pre-defined information, by receiving another message from another node (e.g., Media Access Control (MAC) command, Radio Resource Control (RRC) message), preconfigured information (e.g., in terms of pattern of time resources when to switch the numerology).

The term "time resource" used herein may correspond to any type of physical resource or radio resource expressed in terms of length of time. Examples of time resources are: symbol, time slot, subframe, short subframe, mini-slot, radio frame, Transmission Time Interval (TTI), interleaving time, etc.

Although functions are described as being performed by a node, e.g., network node, wireless device, etc., it is noted that implementations are not limited to a single physical device. It is contemplated that the functions described herein can be distributed across multiple physical devices, including those separated across a network cloud such as a backhaul network or the Internet.

Figure 3:
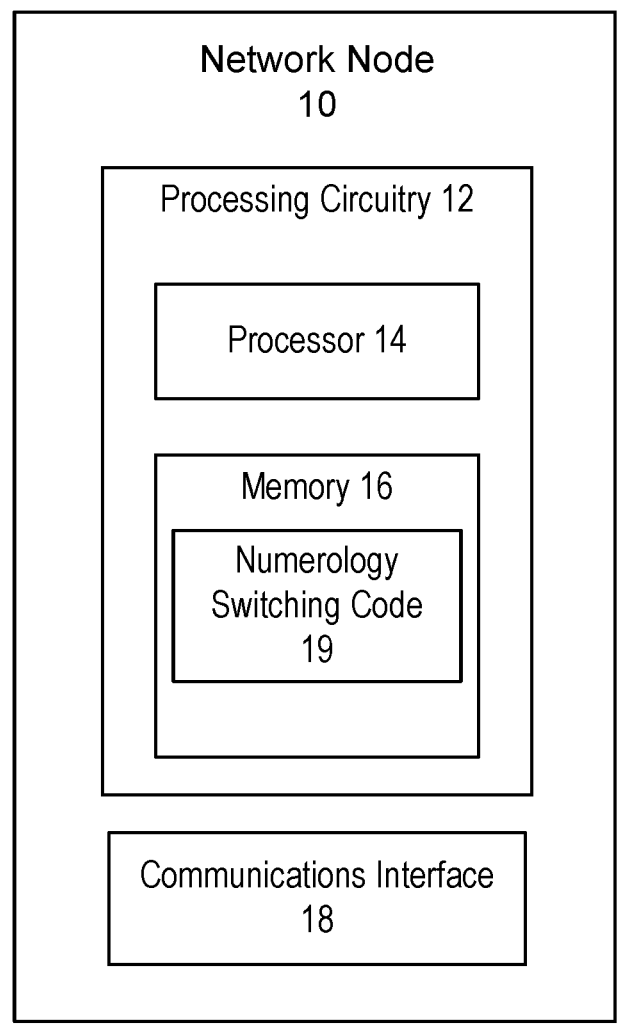
FIG. 3 is a block diagram of an exemplary network node configured to switch between different numerologies in accordance with the principles of the present disclosure.

Referring now to drawing figures in which like reference designators refer to like elements there is shown in FIG. 3 an exemplary network node 10 configured to switch between different numerologies based on a node's switching capability.

Network node 10 includes processing circuitry 12. Processing circuitry 12 includes processor 14 and memory 16. In addition to a traditional processor and memory, processing circuitry 12 may comprise integrated circuitry for processing and/or control, e.g., one or more processors and/or processor cores and/or FPGAs (Field Programmable Gate Array) and/or ASICs (Application Specific Integrated Circuitry). Processor 14 may be configured to access (e.g., write to and/or reading from) memory 16, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 16 may be configured to store code executable by processor 14 and/or other data, e.g., data pertaining to communication, e.g., configuration and/or address data of nodes, etc.

Network node 10 includes one or more communication interfaces 18 for communicating with one or more other network nodes 10, one or more wireless devices, and/or other elements in a communications network. In one or more embodiments, communication interface 18 includes one or more transmitters, one or more receivers and/or one or more communication circuitry.

Processing circuitry 12 may be configured to control any of the methods and/or processes described herein and/or to cause such methods and/or processes to be performed, e.g., by network node 10 functions describe herein. Processor 14 corresponds to one or more processors 14 for performing network node 10 functions described herein. Network node 10 includes memory 16 that is configured to store data, programmatic software code and/or other information described herein. In one or more embodiments, memory 16 is configured to store numerology switching code 19. For example, numerology switching code 19 stores instructions that, when executed by processor 14, causes processor 14 to perform some or all of the processes discussed with respect to the embodiments discussed herein. Network node 10 includes one or more communications interfaces 18 for communicating with one or more other network nodes 10, one or more wireless devices, and/or other elements in a communications network. In one or more embodiments, communication interface 18 includes one or more transmitters, one or more receivers and/or one or more communication circuitry.

Figure 4:
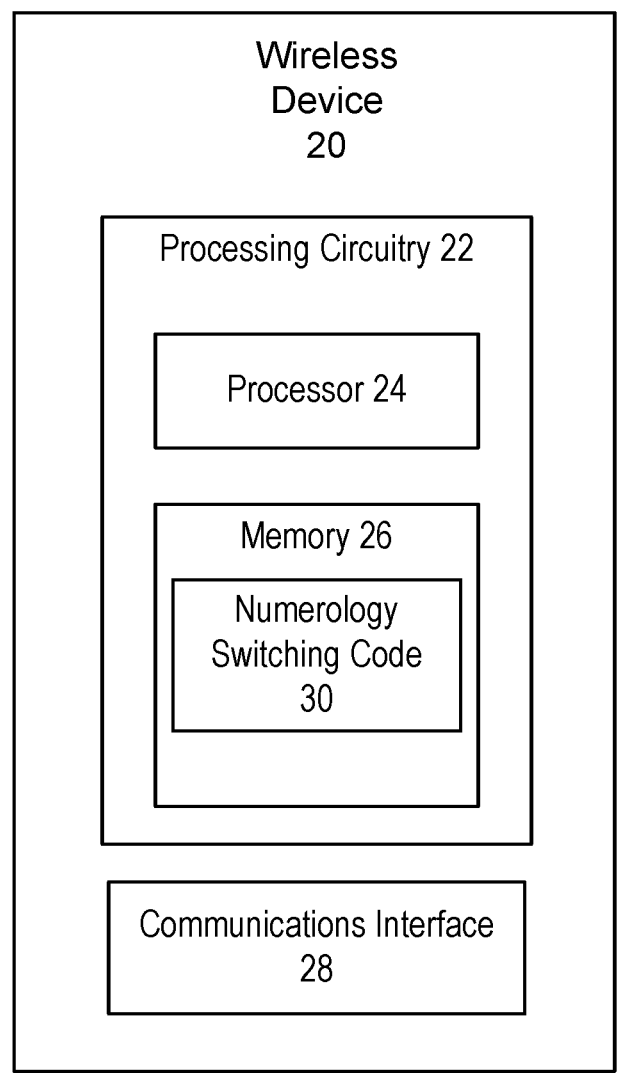
FIG. 4 is a block diagram of an exemplary wireless device configured to switch between different numerologies in accordance with the principles of the present disclosure.

FIG. 4 is a block diagram of an exemplary wireless device 20 configured to switch between different numerologies based on a node's switching capability.

Wireless device 20 includes processing circuitry 22. Processing circuitry 22 includes processor 24 and memory 26. Wireless device 20 also includes communications interface 28.

In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry). Processor 24 may be configured to access (e.g., write to and/or reading from) memory 26, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 26 may be configured to store code executable by processor 24 and/or other data, e.g., data pertaining to communication, e.g., configuration and/or address data of nodes, etc.

Processing circuitry 22 may be configured to control any of the methods and/or processes described herein and/or to cause such methods and/or processes to be performed, e.g., by wireless device 20 functions described herein. Wireless device 20 includes memory 26 that is configured to store data, programmatic software code and/or other information described herein. In one or more embodiments, memory 26 is configured to store numerology switching code 30. For example, numerology switching code 30, causes processor 24 to perform some or all of the processes discussed with respect to the embodiments discussed herein.

Figure 5:
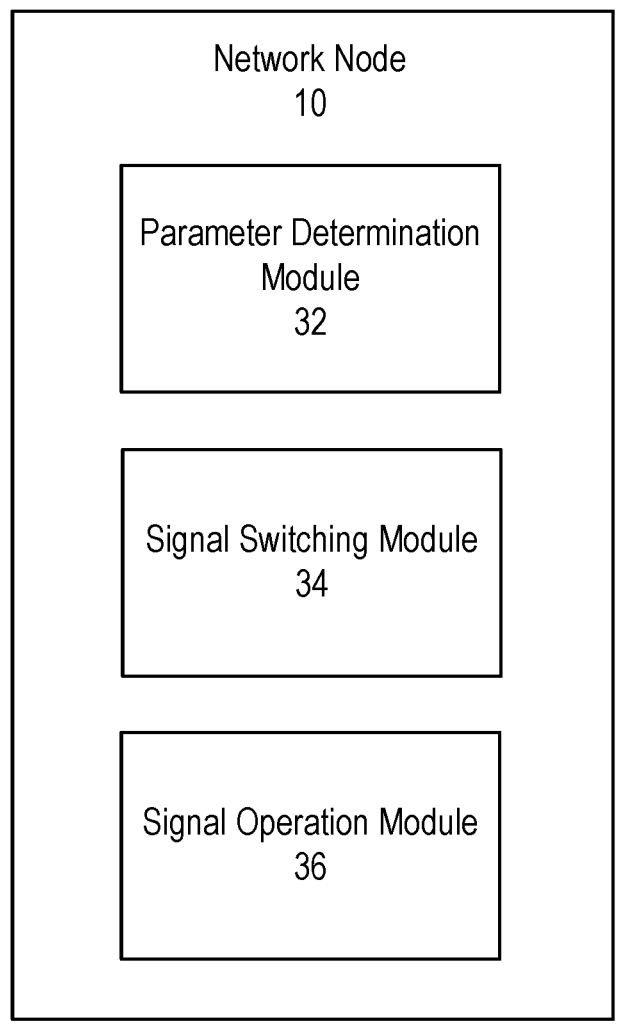
FIG. 5 is a block diagram of an alternate network node configured to switch between different numerologies supported by the network node in accordance with the principles of the present disclosure.

FIG. 5 is a block diagram of an alternate network node 10 configured to switch between different numerologies based at least on capabilities of the network node 10. Network node 10 includes a parameter determination module 32 configured to determine at least one parameter that can be used by network node 10 for switching between a first signal operating with a first numerology and a second signal operating with a second numerology, a signal switching module 34 configured to switch between the first signal and the second signal based on the at least one parameter, and a signal operation module 36 configured to, after the switching, operate at least one of the first signal and the second signal between network node 10 and a second node.

Figure 6:
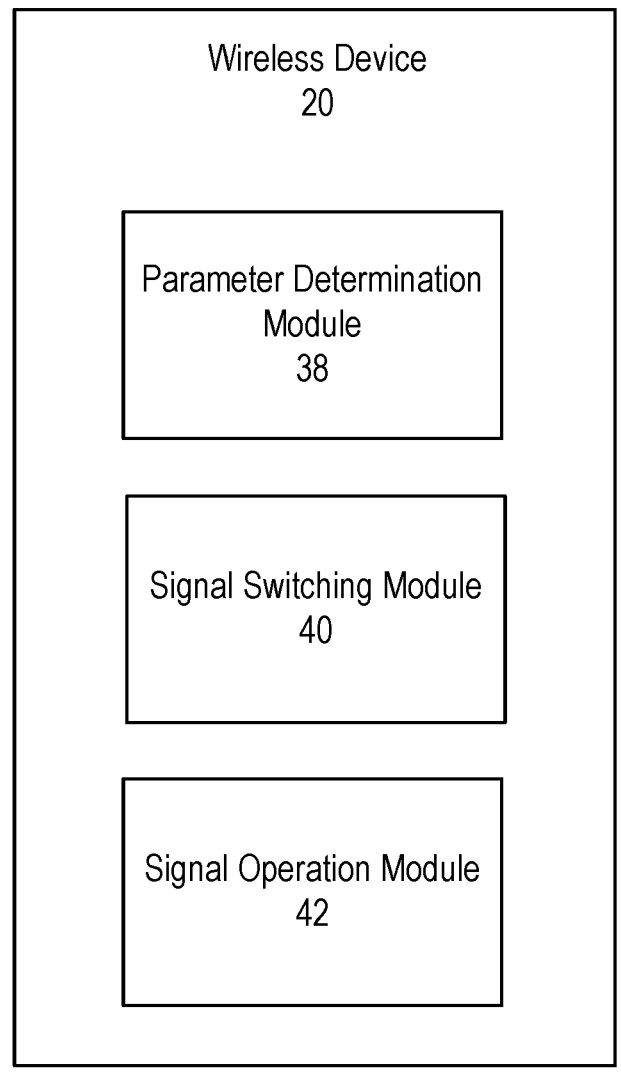
FIG. 6 is a block diagram of an alternate wireless device configured to switch between different numerologies supported by the wireless device in accordance with the principles of the present disclosure.

FIG. 6 is a block diagram of an alternate wireless device 20 configured to switch between different numerologies based at least on capabilities of wireless device 20. Wireless device 20 includes a parameter determination module 38 configured to determine at least one parameter that can be used by wireless device 20 for switching between a first signal operating with a first numerology and a second signal operating with a second numerology, a signal switching module 40 configured to switch between the first signal and the second signal based on the at least one parameter, and a signal operation module 42 configured to after the switching, operate at least one of the first signal and the second signal between wireless device 20 and a second node.

Figure 7:
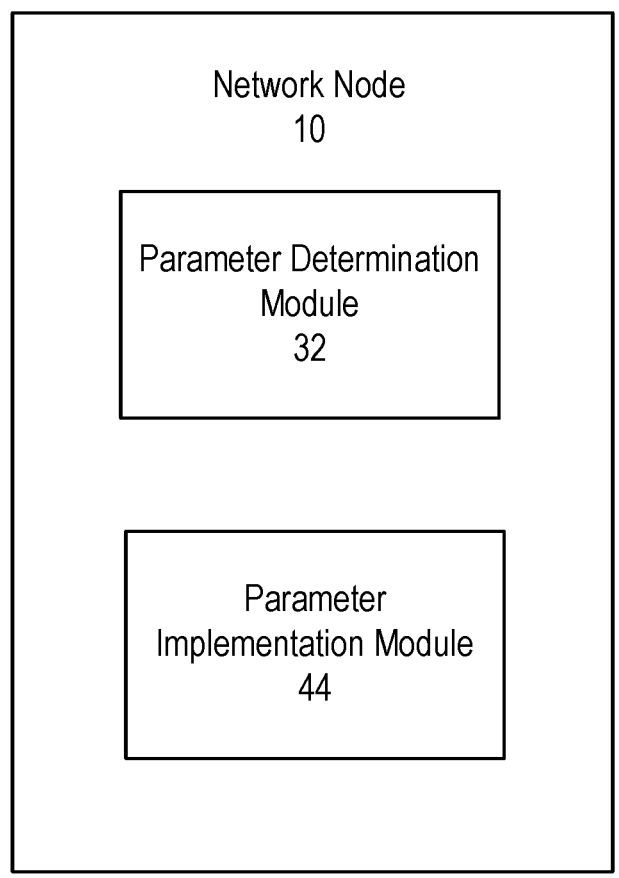
FIG. 7 is a block diagram of an alternate network node configured to switch between different numerologies supported by the network node and a second node in accordance with the principles of the present disclosure.

FIG. 7 is a block diagram of an alternate network node 10 configured to switch between different numerologies based at least on capabilities of network node 10. Network node 10 includes parameter determination module 32 configured to determine at least one first parameter used by network node 10 for switching between a first signal operating with a first numerology and a second signal operating with a second numerology, configured to determine at least one second parameter used by the second node for switching between the first signal operating with the first numerology and the second signal operating with the second numerology, and configured to determine a third parameter that is a function of at least one of the at least one first parameter and the at least one second parameter. Network node 10 of FIG. 7 also includes a parameter implementation module 44 configured to use the third parameter for at least one operational task.

Figure 8:
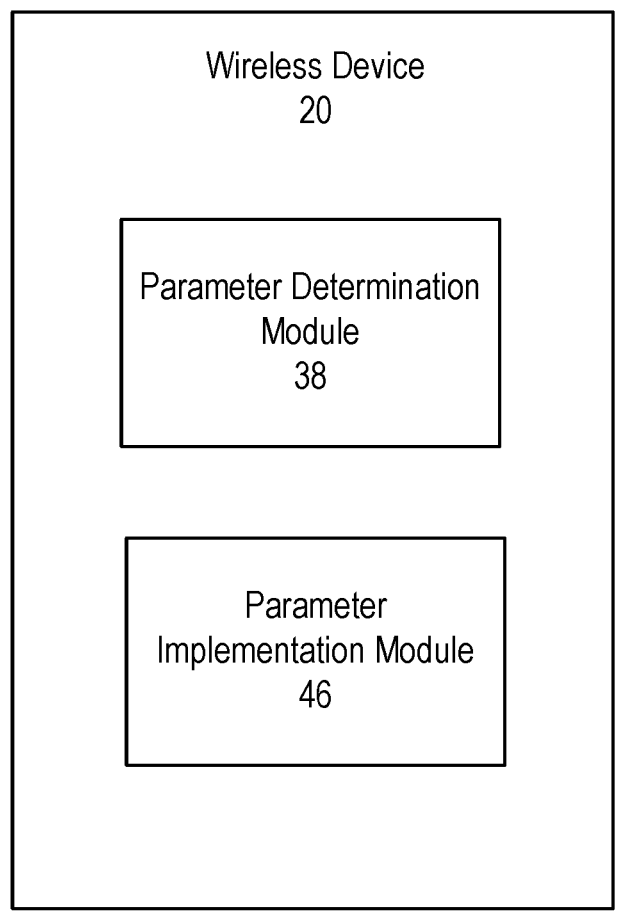
FIG. 8 is a block diagram of an alternate wireless device configured to switch between different numerologies supported by the wireless device and a second node in accordance with the principles of the present disclosure.

FIG. 8 is a block diagram of an alternate wireless device 20 configured to switch between different numerologies based at least on capabilities of wireless device 20. Wireless device 20 includes parameter determination module 38 configured to determine at least one first parameter used by wireless device 20 for switching between a first signal operating with a first numerology and a second signal operating with a second numerology, configured to determine at least one second parameter used by the second node for switching between the first signal operating with the first numerology and the second signal operating with the second numerology, and configured to determine a third parameter that is a function of at least one of the at least one first parameter and the at least one second parameter. Wireless device 20 of FIG. 8 also includes a parameter implementation module 46 configured to use the third parameter for at least one operational task.

Figure 9:
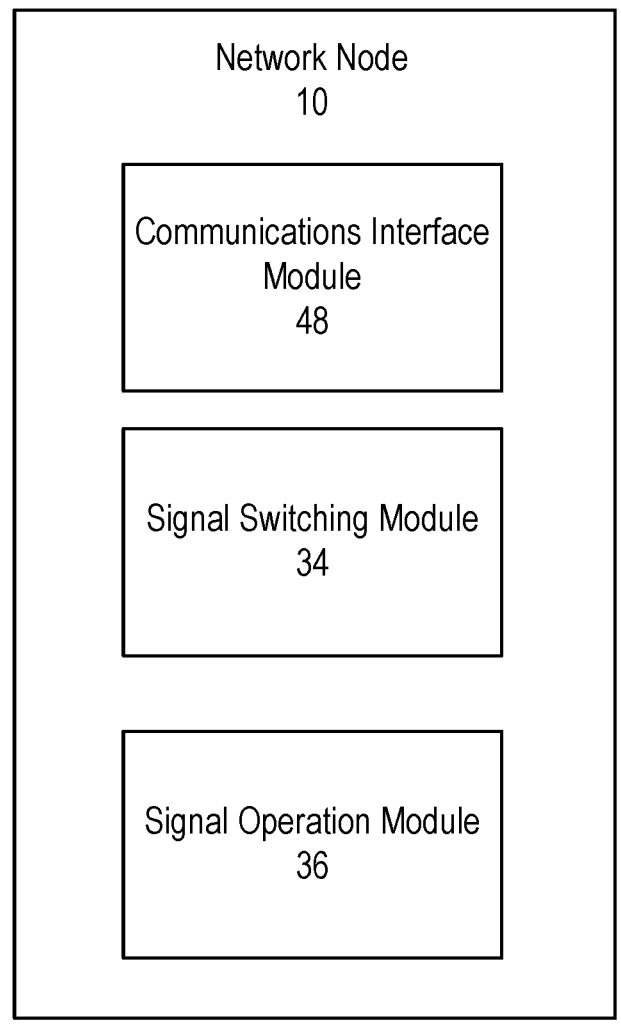
FIG. 9 is a block diagram of an alternate network node configured to switch between different numerologies supported by the network node and another node in accordance with the principles of the present disclosure.

FIG. 9 is a block diagram of an alternate network node 10 configured to switch between different numerologies based at least on switching capabilities of network node 10 and another node. Network node 10 includes a communications interface module 48 configured to: receive from the other node information regarding at least one first parameter to be used by network node 10 for switching between a first signal operating with a first numerology and a second signal operating with a second numerology, signal switching module 34 configured to switch between the first signal and the second signal based at least upon the received information regarding the at least one first parameter, and signal operation module 36 configured to after the switching, operate at least one of the first signal and the second signal between network node 10 and the other node.

Figure 10:
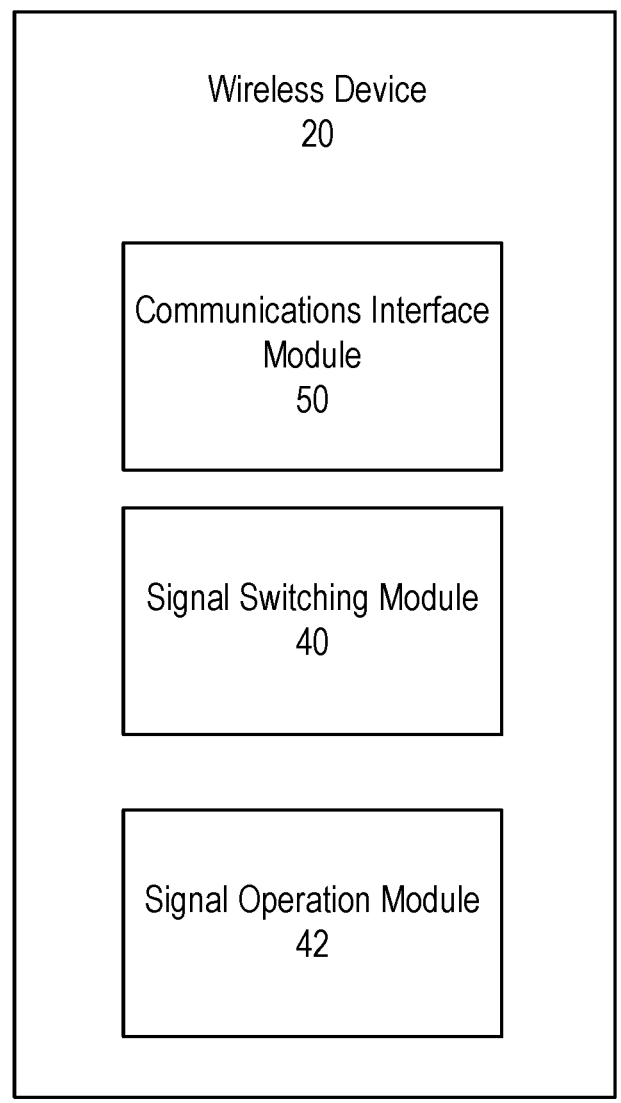
FIG. 10 is a block diagram of an alternate wireless device configured to switch between different numerologies supported by the wireless device and another node in accordance with the principles of the present disclosure.

FIG. 10 is a block diagram of an alternate wireless device 20 configured to switch between different numerologies 20 based on switching capabilities of wireless device 20 and another node. Wireless device 20 includes a communications interface module 50 configured to receive from the other node information regarding at least one first parameter to be used by wireless device 20 for switching between a first signal operating with a first numerology and a second signal operating with a second numerology, signal switching module 40 configured to switch between the first signal and the second signal based at least upon the received information regarding the at least one first parameter, and signal operation module 42 configured to, after the switching, operate at least one of the first signal and the second signal between wireless device 20 and the other node.

The network node 10, wireless device 20, and methods disclosed herein may provide the following advantage: allowing for the configuring of multiple numerologies on the same carrier. Numerologies can be changed but certain performance requirements may be maintained by the network node 10 and/or wireless device 20. Behavior of the wireless device 20 when the numerology is switched may be well defined. Methods scalable with transmission (TX) and receiver (RX) node capabilities may be defined.

In some embodiments, a first node (Node1) is used. Node1 can be a network node 10 or wireless device 20. Also, in some embodiments, a second node (Node2) is used. Node2 can also be a network node 10 or a wireless device 20. Thus, as used herein, when a node can either be network node 10 or wireless device 20, the terminology "Node" or "Node 1" or "Node 2" may be used to indicate that the functions performed by the Node can be performed by either network node 10 or wireless device 20. Node1 and Node2 can be any combination of wireless device 20 and network node 10. In one example, Node1 and Node2 can be a wireless device 20 and a network node 10, respectively. In another example, Node1 and Node2 can be a network node 10 and a wireless device 20, respectively. In yet another example, Node1 and Node2 can be wireless device 1 and wireless device 2, respectively, i.e., both are wireless devices capable of, for example, D2D or V2V operation.

In some embodiments, if Node1 or Node2 is the wireless device 20, then it can operate signals (e.g., S1 and S2) for DL and/or UL operation or for sidelink operation (e.g., D2D communication, V2V communication, etc.). If Node1 or Node2 is the network node 10, then it may operate signals (e.g., S1 and S2) for DL and/or UL operation.

In some embodiments, different numerologies used in a network can belong to the same service or different services. For example, signal S1 can be any of a unicast signal (e.g., including non-MBSFN subframes) and a multicast signal (e.g., including MBSFN subframes). Signal S2 can also be any of a unicast signal (e.g., including non-MBSFN subframes) and a multicast signal (e.g., including MBSFN subframes). The embodiments may be applicable for switching between any combination of unicast and multicast signals, e.g., when both S1 and S2 are unicast, both S1 and S2 are multicast, S1 and S2 are unicast and multicast, respectively, or S1 and S2 are multicast and unicast, respectively.

Method in a First Node of Switching between Different Numerologies Based on a First Node's Switching Capability According to one embodiment of the present disclosure, a method in a first node (Node1) includes the following steps.

Step 1: Determining at least one parameter (P) used by Node1 for switching between a first signal (S1) and a second signal (S2) operating with a first numerology (N1) and with a second numerology (N2), respectively;

Step 2: Switching between S1 and S2 based on at least one determined parameter; and Step 3: Operating, after the switching, any of the signals, S1 and S2, between Node1 and a second node (Node2).

The above steps are described in further detail below.

Step 1: According to one embodiment of the present disclosure, a method in a first node (Node1) is provided. The method includes determining, either by processor 14 if Node 1 is network node 10, or by processor 24, if Node 1 is wireless device 20, at least one parameter (P) used by Node1 for switching between a first signal (S1) and a second signal (S2) operating with a first numerology (N1) and with a second numerology (N2) respectively.

In the first step, Node1 determines at least one parameter (P) which can be used by Node1 for switching (or changing or modifying or adapting) between a first signal (S1) and a second signal (S2). The signals, S1 and S2, operate with a first numerology (N1) and with a second numerology (N2), respectively. An example of a numerology is a subcarrier spacing (Sp). For example, S1 and S2 may be operated by a first subcarrier spacing (Sp1) and a second subcarrier spacing (Sp2).

The embodiments described herein are applicable for any number and type of signals operated by Node1 using different numerologies, e.g., S1, S2, a third signal (S3), a fourth signal (S4), etc., operated by N1, N2, N3, N4, etc., respectively, or more specifically S1, S2, S3, S4, etc., operated by Sp1, Sp2, Sp3, Sp4, etc., respectively. The term "operating a signal" as used herein is a generic term, which herein means transmitting the signal and/or receiving the signal. The operating of signals, S1 and S2, described herein means that, for example, Node1 transmits signal S1 and/or signal S2 and/or Node 1 receives signal S1 and/or signal S2. As an example, Node1 may transmit signal S1 and/or signal S2 to at least one another node, i.e., a second node (Node2). In another embodiment, Node1 may receive signal S1 and/or signal S2 from at least Node2.

The parameter used for switching between signal S1 and signal S2 is related to the numerologies that are used in time resources (e.g., radio frames) and is based on at least capabilities and requirements associated with Node1. The first node uses one or combination of these parameters for switching between numerologies. Examples of these parameters and requirements related to switching between any two numerologies (e.g., between N1 to N2) are described below.

Numerology Switching Delay or Time to Switch between Numerologies (Dn)

Dn may be considered the time required by Node1 to switch between signal S1 and signal S2. The switching delay (Dn) may include at least time to initiate switching (Dp) and some interruption time (Di), e.g., Dn=f(Dp, Di) or as a specific example Dn=Dp+Di. Dp may be considered the time to process message or command requesting Node1 to perform the switching. After the processing of the message, Node1 may determine that numerology has to be switched from N1 to N2 or vice versa. The message or command can be received internally from higher layers or from another node. Therefore, during at least part of the switching delay, the signals S1 and S2 may be interrupted at Node1, i.e., during Di. During this time, Node1 may use its resources (e.g., radio circuitry) to adapt to the new numerology of the new signal to be transmitted after the change of the numerology. Therefore, Dn may be at least partly related to the processing of the numerology switching procedure in Node1. In one example, the switching delay (Dn) is the same for switching from N1 to N2 or from N2 to N1. Dn may depend on at least one of N1 and N2. In another example, Dn may depend on a particular numerology. In yet another example, Dn may depend on whether switching occurs from N1 to N2 or from N2 to N1. For example, switching time, Dn1, is required to switch from N1 to N2, while switching time, Dn2, is required to switch from N2 to N1. The switching delay is explained with the following specific examples.

In one example, the subcarrier spacing switching delay (Ds) is the time required for switching from Sp1 to Sp2 or from Sp2 to Sp1. Ds may also depend on at least one of Sp1 and Sp2. In another example, Ds may also depend on whether switching occurs from Sp1 to Sp2 or from Sp2 to Sp1. For example, switching time, Ds1, is required to switch from Sp1 to Sp2, while switching time, Ds2, is required to switch from Sp2 to Sp1.

In another example, the switching time may depend on the smaller of the two subcarrier spacings involved in switching, e.g., it may depend on 1.25 kHz instead of 15 kHz if the switching occurs between 1.25 kHz and 15 kHz.

In yet another example, the switching time may depend on the largest of the CP lengths of the two numerologies involved in switching.

In yet another example, the switching is function of a certain time resource, e.g., k1 times CP length (K*CP length), K2 times symbol length (K2*symbol length), K3 times time slot (K3*time slot), K4 times subframe (K4*subframe), etc., where K1, K2, K3 and K4 are positive numerical values.

Figure 11:
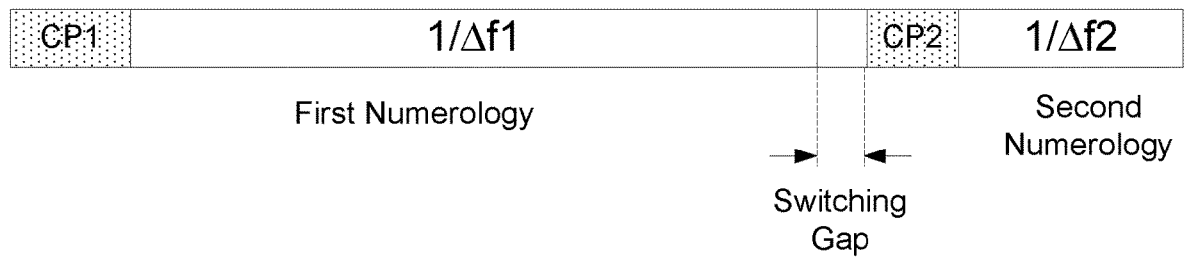
FIG. 11 is a diagram of an example of two different OFDM symbols with different numerologies accordance with the principles of the present disclosure.

In yet another example, a switching gap (i.e., switching time) between the two numerologies is provided, where based on the change in numerology, a gap is placed between the two symbols. Examples of this requirement can be a radio frequency requirement such as rise and fall time of the signal, etc. FIG. 11 provides an example of two different OFDM symbols with different numerologies and with a switching gap, according to one embodiment of the present disclosure.

Interruption time (Di) due to Switching

During this time, Node1 may not transmit or receive any signal. The interruption may occur after the lower layers of Node1 (e.g., physical layer) actually perform the change in the numerology from N1 to N2 or vice versa. In one example, the parameter, Di, can be expressed in terms of time period such as Y1 µs, Y2 ms, etc. In another example, Di can be expressed in terms of certain number of time resources (e.g., Y3*time slot, where Y3≥1). In yet another example, interruption time can be expressed in terms of probability of missed feedback signals transmitted by Node1 under continuous transmission of data to Node1 by Node2. Examples of feedback signals are Hybrid Automatic Repeat Request (HARQ) feedback such as ACK/NACK. For example, Di can be expressed in terms of 1% probability of missed ACK/NACK during the numerology switching procedure.

Frequency of Switching between Numerologies or Minimum Time between Successive Numerology Switching (Tn)

The minimum time between successive switching events (Tn) is defined herein as how often a switching between the numerologies can occur. This parameter (Tn) is also called switching periodicity. For example, if a first switching between N1 and N2 occurs at a first time instance, T1, the next successive switching between N1 and N2 is allowed to take place at a second time instance, T2, and then Tn=T2−

T1. Time (Tn) may allow Node1 some time for executing necessary procedures or operations in an efficient way. Examples of such tasks are acquiring and/or transmitting necessary signals, synchronization, reading the new system information, etc. Therefore, in some embodiments, numerology switching is not allowed to take place faster than every Tn. Examples of Tn are provided below.

In one example, Tn includes at least Dn and some additional time (Da). For example, Tn=f(Dn, Da), or in one specific example, Tn=Dn+Da.

In another example, the parameter Tn may be the same regardless of N1 and N2 or it may depend on N1 and/or N2.

In another example, the parameter Tn may depend on numerologies involved in at least one of the successive numerology switching actions.

In another example, Tn=Ts, which is the minimum time between successive switching of subcarrier spacings. For example, if a first switching between Sp1 and Sp2 occurs at a first time instance, Ts1, the next successive switching between Sp1 and Sp2 is allowed to take place at a second time instance, Ts2, then Ts=Ts2−Ts1.

In another example, parameter Tn or Ts is related to the periodicity or occurrence of specific type of signal or time resource. For example, Tn=L1*radio frame. In one example, Tn=L2*Tb where Tb=periodicity of time resource containing specific type of signal. Examples of specific signals are broadcast channel, Channel-Associated Signaling (CAS), MCCH, Physical Broadcast Channel (PBCH), Sounding Reference Signal (SRS), Demodulation Reference Signal (DRS), CSI-RS, etc.

Specific Time Resources Allowed for Switching

In some embodiments, according to this parameter, the switching between numerologies is allowed, recommended, preferred or used more frequently only in certain time resources, also known as allowed time resources. For example, the numerology may be allowed to be changed in a time resource immediately before or in a time resource immediately after a time resource containing system information (e.g., CAS).

Time Resources Restricted (or Forbidden or Not Allowed) for Switching

In some embodiments, according to this parameter, the switching between numerologies is not allowed or is not recommended in certain time resources, also known as restricted time resources. Examples of such resources are time resources containing system information (e.g. CAS). In another embodiment, time resources contain signals with a less robust transport format. Examples of signals with a less robust transport format include signals encoded with higher order modulation and/or higher coding rate. Examples of higher order modulation are 16QAM compared to Quadrature Phase Shift Keying (QPSK) or 64 Quadrature Amplitude Modulation (QAM), etc.

Numerologies Allowed for Switching

In some embodiments, according to this parameter, only a subset of the possible numerologies may be allowed to operate in Node1 over a certain part of the spectrum, e.g., frequency bands. For example, in band Z1, the numerologies N1, N2 and N3 are allowed, while in band Z2, the numerologies N1 and N4 are allowed. In the case where Node1 operates in band Z1 then switching between any of N1, N2 and N3 may be possible. But when Node1 operates in band Z2, then switching between N1 and N4 may be possible. The restriction may apply to both multicast and unicast operations or can be different for multicast and unicast operations. The restriction may also depend on whether Node1 is in the network node 10 or wireless device 20.

Part of a Spectrum Allowed for Switching

Figure 12:
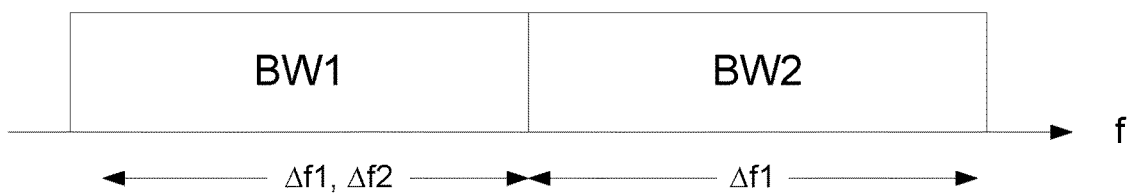
FIG. 12 is a diagram showing two partitions of a spectrum with different restrictions on switching between numerologies in accordance with the principles of the present disclosure.

In some embodiments, according to this parameter, the switching between numerologies is restricted to certain parts of the spectrum that are used by Node 1. FIG. 12 shows an example where the two parts of spectrum (BW1 and BW2) can operate using different numerologies and there are different restrictions for switching between numerologies in different parts of the spectrum. Examples of the two numerologies are subcarrier spacings of $\Delta f1$ and $\Delta f2$.

In this example, in BW1 both $\Delta f1$ and $\Delta f2$ are allowed and Node1 can switch between the two subcarrier spacings in BW1. However, in BW2, only M1 is allowed to be used by Node1. Examples of such scenario can be in new radio (NR) (5G systems) where the spectrum can be divided into several partitions based on use cases, etc. For example, in certain parts of the spectrum, different subcarrier spacings are allowed. In yet another embodiment, the above restriction may be applied for a certain period of time which means that after a certain period, another restriction may be applied or a restriction may be removed.

FIG. 12 illustrates two partitions of the spectrum with different restrictions on switching between numerologies.

The above-mentioned parameters can be expressed in terms of requirements related to the switching between numerologies. These requirements may be met by the node doing numerology switching, e.g., Node1. Such requirements can be pre-defined, and autonomously determined by the first node (e.g., wireless device 20) based on its implementation, or can be configured by another node (e.g., another network node 10). For example, it may be pre-defined that the maximum allowed interruption of signals at the node (e.g., wireless device 20) due to numerology switching is 1 subframe.

The node (e.g., Node1, wireless device 20, or network node 10) may also meet certain requirements provided that the numerology switching is performed by the node in accordance with one or more parameters related to the switching defined above. For example, the node may meet certain requirements, for example, receiver sensitivity, emission requirements, transmit modulation quality (e.g., Error Vector Magnitude (EVM)) provided that the numerology switching is performed by the node based on one or more of the above parameters related to the switching, e.g., switching is done not more than once per radio frame, etc.

The switching impact can also be different for different services. If there is a switching impact, two different sets of requirements may apply for different services depending on the preceding and/or succeeding numerology. For example, in switching between multicast and unicast, a symbol or a part of the CP may be lost; in order to avoid that there may be certain requirements for such a change.

In some embodiments of the present disclosure, the above-mentioned requirements used for switching between numerologies may be defined to meet the following constraints or capability of the first node:

Hardware capabilities of Node1: How fast the transmitter or receiver can change the baseband or radio operations. As an example, a transmitter or receiver may have certain hardware limitations on how quickly it can change its baseband operation;

Regulatory requirements: There may be regulatory requirements for certain bands, geographical areas, etc., that prohibits switching more than a certain number of times per unit time. This may set or define the minimum time between any two successive numerology switching actions or events;

Radio frequency (RF) requirements: There can be certain radio frequency requirements, such as On/Off time mask, and/or rise and fall time when switching the transceiver on or off, emission requirements, etc. This may be related to the RF architecture of Node1. The RF architecture may include components such as power amplifier, RF filter, antennas, etc. An example of a transceiver is a circuitry including a receiver and/or transmitter;

Baseband performance requirements: There may be certain baseband performance requirements, such as demodulation requirements, etc. For example, this requirement can be defined in terms of the required received signal quality (e.g., Signal to Noise Ratio (SNR), Signal-to-Interference-Plus-Noise Ratio (SINR), etc.) at the node (e.g., either network node 10 or wireless device 20) to achieve a certain amount of throughput or bit rate (e.g., X % of maximum throughput, average throughput, Yth percentile of throughput, etc.). In order to achieve the desired throughout the numerology switching may not be performed too frequently, i.e., in some embodiments, not more than once every Tn.

Step 2: Switching between S1 and S2 based on at least one determined parameter. In this step, the first node (e.g., wireless device 20 or network node 10) may perform switching between signal S1 and signal S2 operating with N1 and N2, respectively, based on at least one determined parameter (P) related to the numerology switching as described in Step 1 above. For example, Node1 provides that the numerology switching is performed within the specified time period, e.g., within Dn. In another example, Node1 will not perform the numerology switching faster than time Tn since the last numerology switching event or action. In yet another example, the switching may be performed in one or more of the specific time resources allowed for performing the numerology switching.

Step 3: In this step, Node1, after performing the numerology switching, operates any of the signals, S1 and S2, between Node1 and a second node. For example, if the switching is performed from N1 to N2, then Node1 will operate signal S2 after the numerology switching. But if the switching is performed from N2 to N1, then Node1 will operate signal S1 after the switching. The term operating the signal as discussed herein shall mean transmitting the signal to another node and/or receiving the signal from another node. For example, Node1 may transmit the signal to Node2 and/or receive the signal from Node2. The signal S1 may further be expressed as S11 and S12, where S11 is transmitted by Node1 while S12 is received by Node1. Similarly, the signal, S2 may further be expressed as S21 and S22, where S21 is transmitted by Node1 while S22 is received by Node1. In yet another aspect of this embodiment, Node1 may restrict scheduling of certain transmissions in DL or UL in subframes adjacent to multicast with a different numerology. One such scheduling adaptation can be to configure the last symbol in a preceding subframe to be empty to avoid interference in the following subframe that has a different numerology.

Method in a First Node of Switching between Different Numerologies Based on a First and Second Node's Switching Capability According to this embodiment, a method in a first node (Node1) (e.g., wireless device 20 or network node 10) includes the following steps:

Step 4: Determining at least one parameter (P) used by Node1 (e.g., wireless device 20 or network node 10) for switching between a first signal (S1) and a second signal (S2) operating with a first numerology (N1) and with a second numerology (N2), respectively.

Step 5: Determining at least one parameter (Q) used by a second node (Node2) (e.g., wireless device 20 or network node 10) for switching between signals S1 and S2 operating with N1 and N2, respectively.

Step 6: Determining a parameter, R which is a function of at least P and Q.

Step 7: Using the determined parameter, R, for one or more operational tasks e.g.,
  configuring Node2 for enabling Node2 to switch between signals S1 and S2 based on at least the determined parameter, R; and
  switching between signals S1 and S2 based on at least one determined parameter, R, etc.

Step 8: Performing steps 4-7 each time numerology switching relevant parameters and/or capabilities in Node1 and Node 2 change.

The above steps will now be described in further detail.

Step 4: In this step, Node1 (e.g., wireless device 20 or network node 10) determines at least one parameter (P) which can be used by Node1 for switching (or changing or modifying or adapting) between a first signal (S1) and a second signal (S2) operating with a first numerology (N1) and with a second numerology (N2), respectively. This step is the same as described in Step 1 above. Therefore, the description in Step 1 above is also applicable for this embodiment.

Step 5: In this step, Node1 determines at least one parameter (Q) which can be used by a second node (Node2) (e.g., wireless device 20 or network node 10) for switching (or changing or modifying or adapting) between signals S1 and S2 operating with a first numerology (N1) and with a second numerology (N2), respectively. The one or more determined parameters for Node2 are the same as described for Node1 in Step 1 above. Therefore, the description of Step 1 is also applicable for this embodiment. However, the value of the same parameter related to the numerology switching may be different for Node1 and Node2. Their values may further depend on whether the node is a network node 10 or a wireless device 20. For example, if Node1 and Node2 are the network node 10 and the wireless device 20, respectively, then the value of the parameter, Dn or Di, for Node2 may be longer than that for Node1.

Node1 may determine Q based on one or more of the following principles:
  Based on pre-defined information or rules, e.g., values of Dn, Ds, Tn, etc., are pre-defined.
  By receiving information about one or more parameters (Q) associated with Node2 from another node. For example, Node2 may transmit such information to Node1 via a message, e.g., MAC, RRC signaling, etc.
  Based on statistics or historical data.
  Implicitly, based on observation such as outcome or results of an event involving feedback from Node2. For example, if Node1 starts receiving signals from Node2 after numerology switching within a certain delay (Dx), then Node1 assumes that the switching delay for Node 2 is Dx.

Step 6: In this step, Node1 (e.g., wireless device 20 or network node 10) determines at least one common parameter, R, which is to be used or assumed for the numerology switching. In some embodiments, the parameter R is a function of at least P and Q determined in the previous steps (Step 4 and Step 5). For example, R can be expressed by Equation (1):

$$R = f1(P, Q) \quad (1)$$

In yet another example R can be expressed by Equation (2):

$$R = f(P, Q, \alpha, \beta) \quad (2)$$

where α and β are implementation margins associated with Node1 and Node2, respectively. As a special case, α and/or β can be neglected.

Specific examples of functions are minimum, maximum, Xth percentile, average, etc.

$$R = MAX(P, Q) \quad (3)$$

In yet another example $$R = P, \text{ i.e., } Q \text{ is neglected.} \quad (4)$$

In yet another example $$R = Q, \text{ i.e., } P \text{ is neglected.} \quad (5)$$

In one example, Node1 may use the same function for determining the values of all or group of the parameters used for numerology switching. In yet another example, Node1 may use different functions for determining the values of different parameters used for numerology switching. As an example, Dn and Tn may be based on expression in Equation (3) and Equation (4), respectively.

Step 7: In this step, Node1 (e.g., wireless device 20 or network node 10) uses the determined parameter, R, for performing one or more operational tasks or procedures. Examples of the operational tasks performed by Node1 are:
Configuring Node2 with information related to the determined value of R. The Node2 may further use this information for switching between the numerologies, i.e., between N1 and N2. For example, if Node2 can perform numerology switching within 1 time slot but if it is configured by Node1 to perform the switching within 2 time slots, then Node2 will do the switching within 2 time slots.
Transmitting information related to the determined value of R to another node, e.g., a network node 10, a neighboring network node 10, another wireless device 20, etc.
Using the information related to the determined value of R for scheduling of signals transmitted to and/or received from Node2.
Performing switching between S1 and S2 based on the determined parameter, R.

Steps 4-7 above may be performed each time numerology switching relevant parameters and/or the capabilities of Node1 and Node 2 change.

Method in a Second Node of Switching between Different Numerologies Based on First and Second Node's Switching Capability According to this embodiment, a method in a second node (Node2) (e.g., wireless device 20 or network node 10) includes the steps of:
Step 9: (Optional step) Transmitting to another node information regarding at least one parameter (Q) used by Node2 for switching between a first signal (S1) and a second signal (S2) operating with a first numerology (N1) and with a second numerology (N2), respectively;
Step 10: Receiving from a first node (Node1) information regarding at least one parameter (R), which is to be used by Node2 for switching between a first signal (S1) and a second signal (S2) operating with a first numerology (N1) and with a second numerology (N2), respectively;
Step 11: Switching between signals S1 and S2 based on at least the received information related to R; and
Step 12: Operating, after the switching, any of the signals S1 and S2, between Node1 and Node2.

The steps above will now be described in further detail.
Step 9: This step is considered optional for Node2. In this step, Node2 transmits to another node (e.g., Node1), information related to at least one parameter (Q) with which numerology switching can be performed by Node2. The information may be transmitted to another node as part of capability information. The information may be transmitted to another node proactively or in response to receiving a request from another node. The at least one parameter (Q) related to the numerology switching can be any of the parameters described in Step 1 above. Therefore, the description in Step 1 is also applicable for this embodiment.
Step 10: In this step, Node2 receives from a first node (Node1) information regarding at least one parameter (R), which is to be used by Node2 for switching signals between a first signal (S1) and a second signal (S2) operating with a first numerology (N1) and with a second numerology (N2), respectively. As described in Step 6 above of the second embodiment, Node1 determines one or more parameters (R) based on a function of parameters, P and Q.
Step 11: In this step, Node2 performs switching between signals S1 and S2 operating with N1 and N2, respectively based on at least one parameter (R) received from Node1 (in Step 9). For example, Node2, based on the received parameter, ensures that the numerology switching is performed within the specified time period. In another example, Node2 performs the numerology switching not more than once per switching period (Tn). In yet another example, the switching may be performed in one or more specific time resources which are allowed for performing the numerology switching.
Step 12: In this step, Node2, after performing the numerology switching, operates any of the signals S1 and S2, between Node2 and Node1. For example, if the switching is performed from N1 to N2, then Node2 will operate signal S2 after the numerology switching. But if the switching is performed from N2 to N1, then Node2 will operate signal S1 after the switching. The term "operating the signal" shall be defined herein as transmitting the signal to another node and/or receiving the signal from another node. For example, Node2 may transmit the signal to Node1 and/or receive the signal from Node1. The signal, S1 may further be expressed as signal S11 and signal S12, where S12 is transmitted by Node2 to Node1 while signal S11 is received by Node2 from Node1. Similarly, the signal S2 may further be expressed as signal S21 and signal S22, where signal S22 is transmitted by Node2 to Node1 while signal S21 is received by Node2 from Node1.

Figure 13:
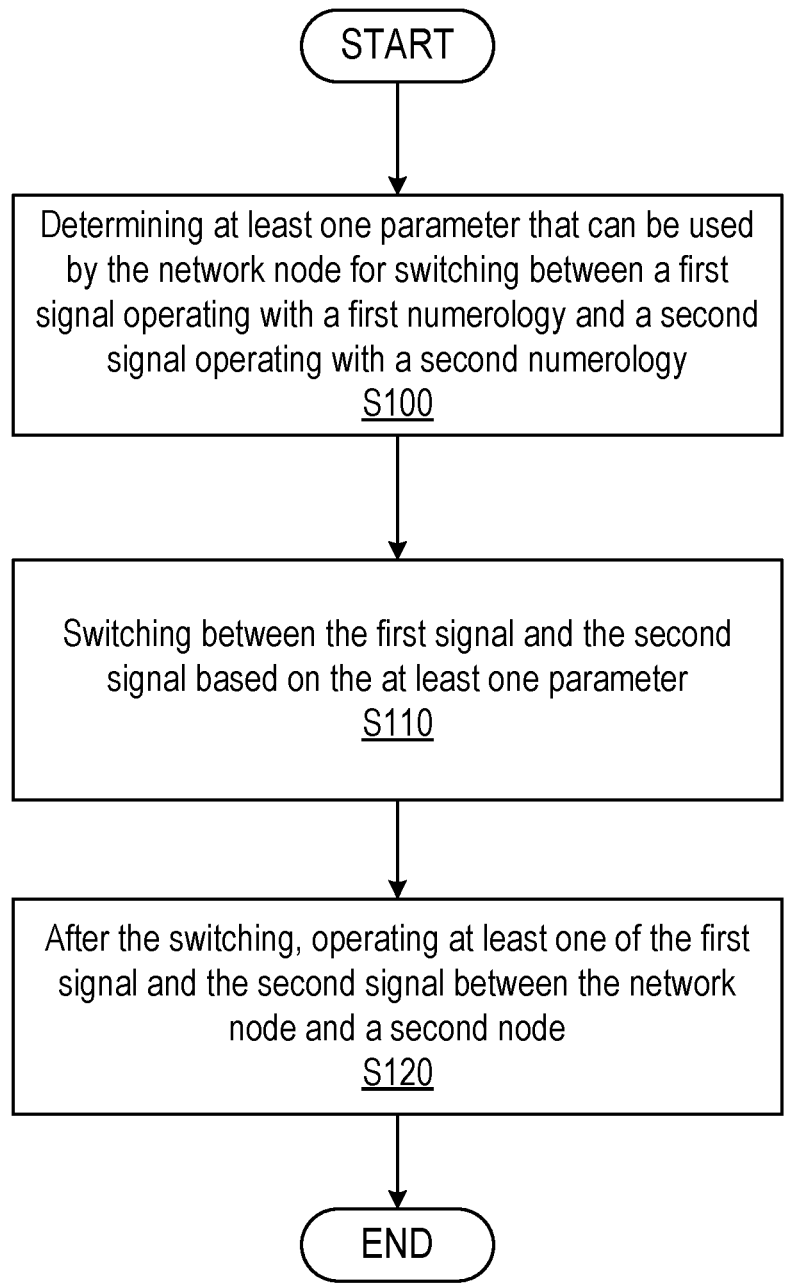
FIG. 13 is a flow diagram illustrating steps performed by a network node for switching between different numerologies based on switching capabilities of the network node in accordance with the principles of the present disclosure.

FIG. 13 is a flow diagram of an exemplary method performed by, for example, the network node 10 for switching between different numerologies based at least on the switching capabilities of the network node 10. In one embodiment, the method includes determining, by for example processor 14 of network node 10, at least one parameter that can be used by the network node 10 for switching between a first signal operating with a first numerology and a second signal operating with a second numerology (Block S100), switching, by for example processor 14 in conjunction with numerology switching code 19, between the first signal and the second signal based on the at least one parameter (Block S110), and after the switching, operating, by for example processor 14, at least one of the first signal and the second signal between the network node and a second node (Block S120).

In one embodiment, the at least one parameter is one of numerology switching delay time, interruption time due to switching, frequency of switching between numerologies, specific time resources allowed for switching, time resources restricted for switching, numerologies allowed for switching, and part of spectrum allowed for switching.

In another embodiment, the first numerology is a first subcarrier spacing and the second numerology is a second subcarrier spacing.

In another embodiment, the method further includes further restricting, by for example processor 14, scheduling of at least one of a downlink and an uplink transmission in subframes adjacent a multicast having a different numerology.

Figure 14:
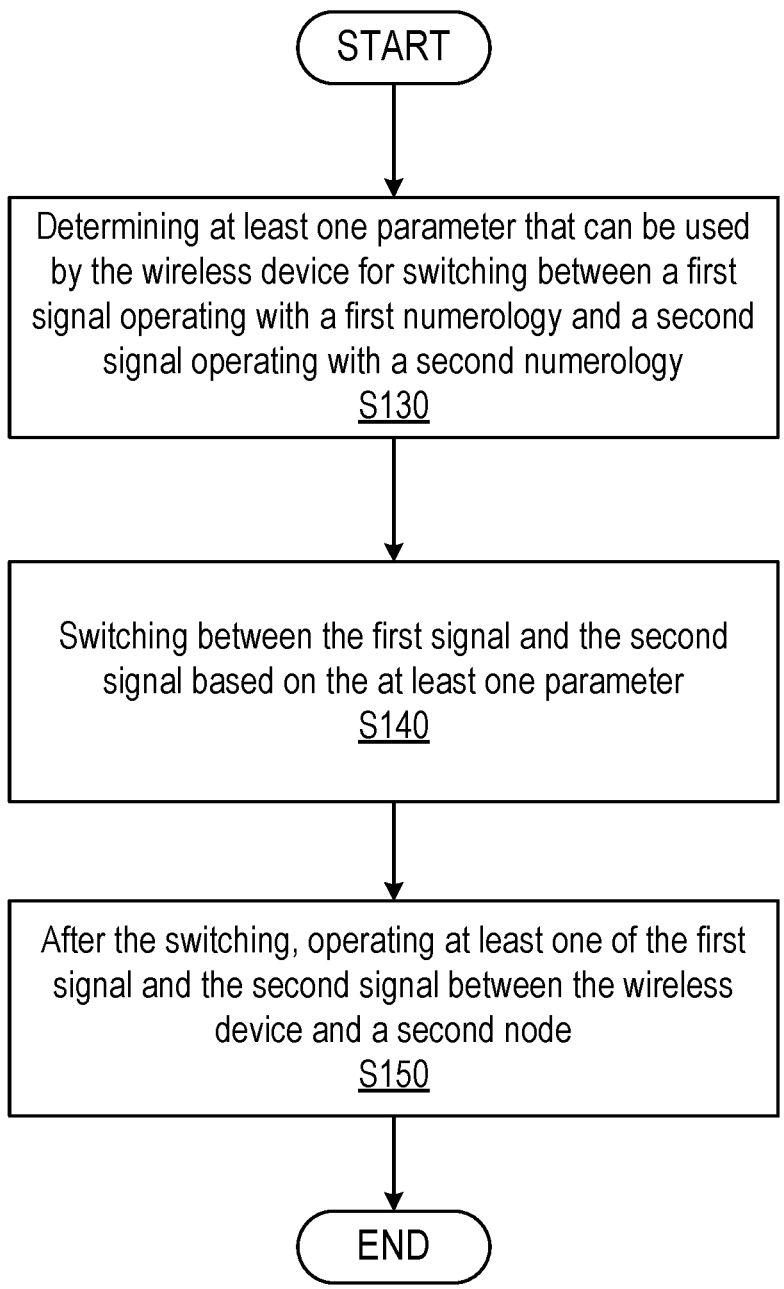
FIG. 14 is a flow diagram illustrating steps performed by a wireless device for switching between different numerologies based on switching capabilities of the wireless device in accordance with the principles of the present disclosure.

FIG. 14 is a flow diagram of an exemplary method performed by, for example, the wireless device 20 for switching between different numerologies based at least on the switching capabilities of the wireless device 20. In one embodiment, the method includes, determining, by for example processor 24 of wireless device 20, at least one parameter that can be used by the wireless device 20 for switching between a first signal operating with a first numerology and a second signal operating with a second numerology (Block S130), switching, by for example processor 24 in conjunction with numerology switching code 30, between the first signal and the second signal based on the at least one parameter (Block S140), and after the switching, operating, by for example processor 24, at least one of the first signal and the second signal between the wireless device 20 and a second node, such as, for example, network node 10 (Block S150).

In one embodiment, the at least one parameter is one of numerology switching delay time, interruption time due to switching, frequency of switching between numerologies, specific time resources allowed for switching, time resources restricted for switching, numerologies allowed for switching, and part of spectrum allowed for switching.

In another embodiment, the first numerology is a first subcarrier spacing and the second numerology is a second subcarrier spacing.

In another embodiment, the method further includes restricting, by processor 24, scheduling of at least one of a downlink and an uplink transmission in subframes adjacent a multicast having a different numerology.

Figure 15:
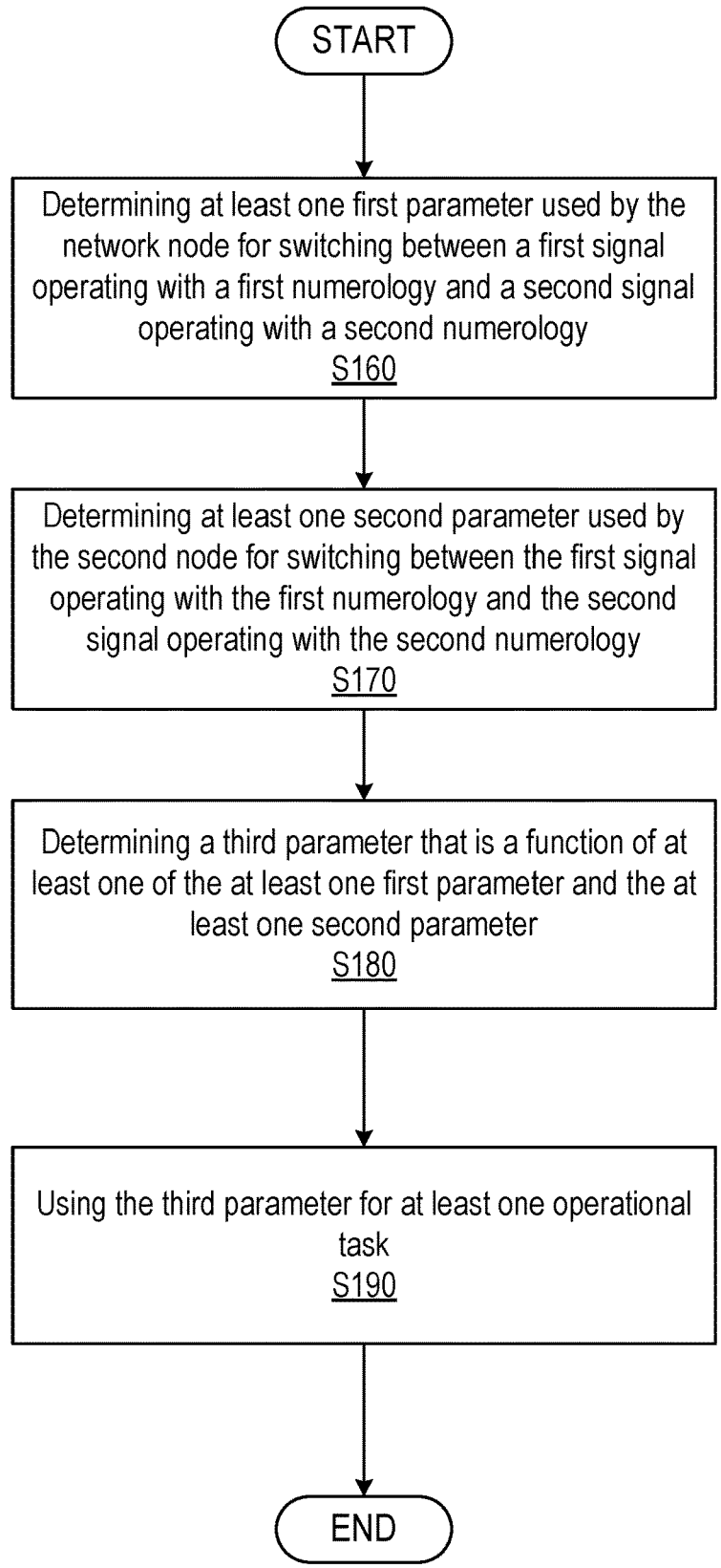
FIG. 15 is a flow diagram illustrating an alternate embodiment of steps performed by a network node for switching between different numerologies based on switching capabilities of the network node in accordance with the principles of the present disclosure.

FIG. 15 is a flow diagram of another exemplary method performed by, for example, the network node 10 for switching between different numerologies based at least on the switching capabilities of the network node 10 and a second node. In one embodiment, the method includes determining, by for example processor 14 of network node 10, at least one first parameter used by network node 10 for switching between a first signal operating with a first numerology and a second signal operating with a second numerology (Block S160), determining, by for example processor 14, at least one second parameter used by the second node for switching between the first signal operating with the first numerology and the second signal operating with the second numerology (Block S170), determining, by for example processor 14, a third parameter that is a function of at least one of the at least one first parameter and the at least one second parameter (Block S180), and using, by for example processor 14, the third parameter for at least one operational task (Block S190).

In another embodiment, a value of the at least one first parameter is the same as a value of the at least one second parameter.

In another embodiment, a value of the at least one first parameter is different than a value of the at least one second parameter.

In another embodiment, the at least one second parameter is determined based on at least one of predefined information, receiving information about the at least one second parameter associated with the second node from another node, at least one of statistics and historical data, and feedback from the second node.

In another embodiment, the at least one operational task includes at least one of configuring the second node with information related to a determined value of the third parameter, transmitting information related to the determined value of the third parameter, using the information related to the determined value of the third parameter for scheduling of signals exchanged with the second node, and performing switching between the first signal and the second signal based on the determined value of the third parameter.

Figure 16:
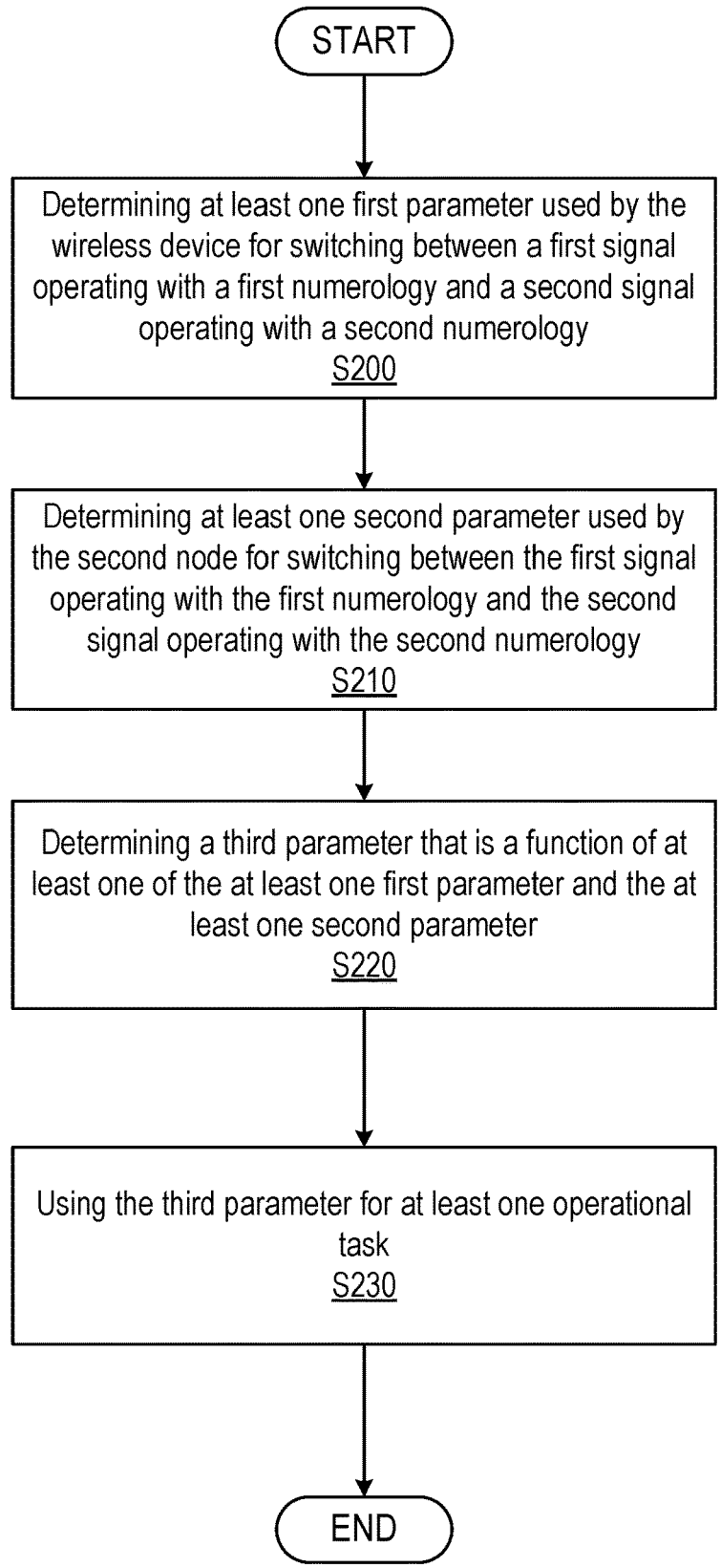
FIG. 16 is a flow diagram illustrating an alternate embodiment of steps performed by a wireless device for switching between different numerologies based on switching capabilities of the wireless device in accordance with the principles of the present disclosure.

FIG. 16 is a flow diagram of another exemplary method performed by, for example, the wireless device 20 for switching between different numerologies based at least on the switching capabilities of the wireless device 20 and a second node. In one embodiment, the method includes determining, by for example processor 24 of wireless device 20, at least one first parameter used by wireless device 20 for switching between a first signal operating with a first numerology and a second signal operating with a second numerology (Block S200), determining, by for example processor 24, at least one second parameter used by the second node for switching between the first signal operating with the first numerology and the second signal operating with the second numerology (Block S210), determining, by for example processor 24, a third parameter that is a function of at least one of the at least one first parameter and the at least one second parameter (Block S220), and using, by for example processor 24, the third parameter for at least one operational task (Block S230).

In another embodiment, a value of the at least one first parameter is the same as a value of the at least one second parameter.

In other embodiment, a value of the at least one first parameter is different than a value of the at least one second parameter.

In another embodiment, the at least one second parameter is determined based on at least one of predefined information, receiving information about the at least one second parameter associated with the second node from another node, at least one of statistics and historical data, and feedback from the second node.

In another embodiment, the at least one operational task includes at least one of configuring the second node with information related to a determined value of the third parameter, transmitting information related to the determined value of the third parameter, using the information related to the determined value of the third parameter for scheduling of signals exchanged with the second node, and performing switching between the first signal and the second signal based on the determined value of the third parameter.

Figure 17:
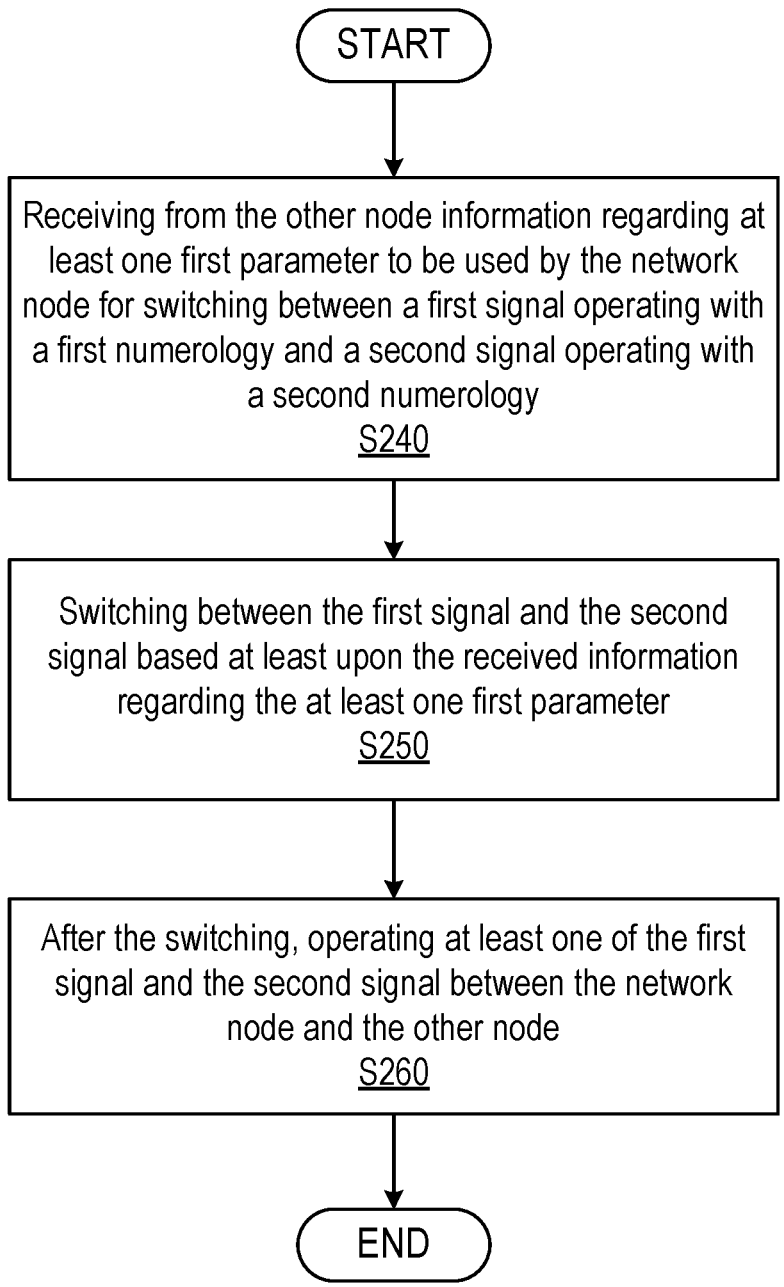
FIG. 17 is a flow diagram illustrating steps performed by a network node for switching between different numerologies based on switching capabilities of the network node and a second node in accordance with the principles of the present disclosure.

FIG. 17 is a flow diagram of another exemplary method performed by, for example, the network node 10 for switching between different numerologies based at least on the switching capabilities of the network node 10 and another node. In one embodiment, the method includes receiving, by communications interface 18 of network node 10, from the other node, information regarding at least one first parameter to be used by network node 10 for switching between a first signal operating with a first numerology and a second signal operating with a second numerology (Block S240), switching, by for example processor 14 in conjunction with numerology switching code 19, between the first signal and the second signal based at least upon the received information regarding the at least one first parameter (Block S250), and after the switching, operating, by for example processor 14, at least one of the first signal and the second signal between network node 10 and the other node (Block S260).

In one embodiment, the method further includes transmitting, by communications interface 18, to the other node, information regarding at least one second parameter used by network node 10 for switching between the first signal operating with the first numerology and the second signal operating with the second numerology.

In another embodiment, the information regarding the at least one second parameter used by network node 10 transmitted to the other node is transmitted in response to receiving a request by the other node.

Figure 18:
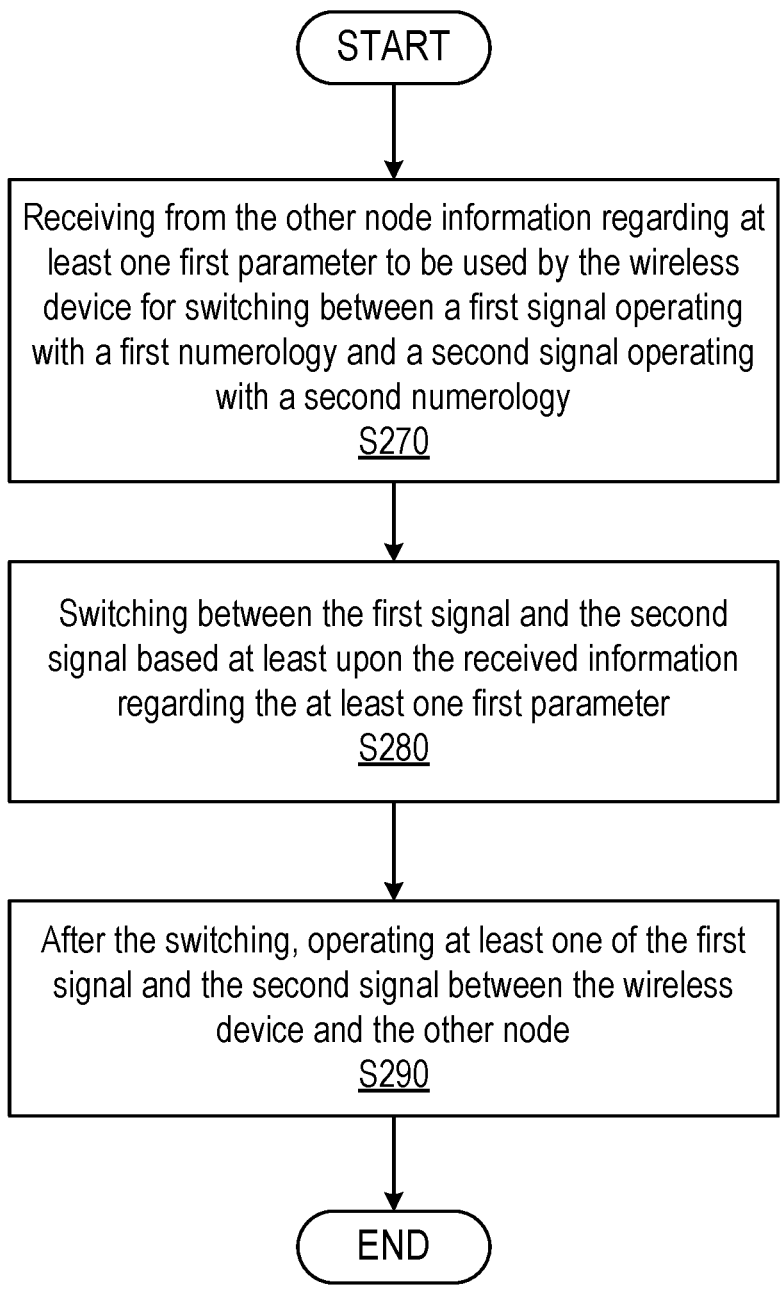
FIG. 18 is a flow diagram illustrating steps performed by a wireless device for switching between different numerologies based on switching capabilities of the wireless device and a second node in accordance with the principles of the present disclosure.

FIG. 18 is a flow diagram of another exemplary method performed by, for example, the wireless device 20 for switching between different numerologies based at least on the switching capabilities of wireless device 20 and another node. In one embodiment, the method includes receiving, by for example communications interface 28 of wireless device 20, from the other node, information regarding at least one first parameter to be used by wireless device 20 for switching between a first signal operating with a first numerology and a second signal operating with a second numerology (Block S270), switching, by for example processor 24 in conjunction with numerology switching code 30, between the first signal and the second signal based at least upon the received information regarding the at least one first parameter (Block S280), and after the switching, operating, by for example processor 24, at least one of the first signal and the second signal between wireless device 20 and the other node.

In another embodiment, the method further includes transmitting, by for example communications interface 28, to the other node, information regarding at least one second parameter used by wireless device 20 for switching between the first signal operating with the first numerology and the second signal operating with the second numerology.

In another embodiment, the information regarding the at least one second parameter used by wireless device 20 transmitted to the other node is transmitted in response to receiving a request by the other node.

Some embodiments include:

According to one aspect, a method in a network node 10 for switching between different numerologies supported by the network node 10 is provided. The method includes determining at least one parameter that can be used by the network node 10 for switching between a first signal operating with a first numerology and a second signal operating with a second numerology (Block S100); switching between the first signal and the second signal based on the at least one parameter (Block S110); and after the switching, operating at least one of the first signal and the second signal between the network node 10 and a second node 10, 20 (Block S120).

According to this aspect, in some embodiments, the at least one parameter includes an interruption time due to switching. In some embodiments, the at least one parameter includes a predefined value corresponding to a maximum allowed interruption time due to switching. In some embodiments, the at least one parameter includes at least one of numerology switching delay time, frequency of switching between numerologies, specific time resources allowed for switching, time resources restricted for switching, numerologies allowed for switching, and part of a spectrum allowed for switching. In some embodiments, the first numerology is a first subcarrier spacing and the second numerology is a second subcarrier spacing, the second subcarrier spacing being different from the first subcarrier spacing. In some embodiments, the method further includes restricting scheduling of at least one of a downlink and an uplink transmission in at least one subframe adjacent a multicast having a different numerology. In some embodiments, operating the at least one of the first signal and the second signal between the network node 10 and the second node 10, 20 comprises at least one of transmitting the at least one of the first signal and the second signal to the second node 10, 20 and receiving the at least one of the first signal and the second signal from the second node 10, 20. In some embodiments, the second node 10, 20 is a wireless device 20. In some embodiments, the method includes receiving from at least one of the second node 10, 20 and another node 10, 20 information regarding the at least one parameter; and switching between the first signal and the second signal based on the at least one parameter comprises switching between the first signal and the second signal based at least upon the received information regarding the at least one parameter. In some embodiments, switching between the first signal and the second signal is further based on a numerology supported by the second node 10, 20. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to another aspect, a network node 10 configured to switch between different numerologies supported by the network node 10 is provided. The network node 10 includes processing circuitry 12 configured to: determine at least one parameter that can be used by the network node 10 for switching between a first signal operating with a first numerology and a second signal operating with a second numerology; switch between the first signal and the second signal based on the at least one parameter; and after the switching, operate at least one of the first signal and the second signal between the network node 10 and a second node 10, 20.

According to this aspect, in some embodiments, the at least one parameter includes an interruption time due to switching. In some embodiments, the at least one parameter includes a predefined value corresponding to a maximum allowed interruption time due to switching. In some embodiments, the at least one parameter includes at least one of numerology switching delay time, frequency of switching between numerologies, specific time resources allowed for switching, time resources restricted for switching, numerologies allowed for switching, and part of a spectrum allowed for switching. In some embodiments, the first numerology is a first subcarrier spacing and the second numerology is a second subcarrier spacing, the second subcarrier spacing being different from the first subcarrier spacing. In some embodiments, the processing circuitry 12 is further configured to restrict scheduling of at least one of a downlink and an uplink transmission in at least one subframe adjacent a multicast having a different numerology. In some embodiments, the network node 10 further includes a communications interface 18 in communication with the processing circuitry 12, the processing circuitry 12 configured to operate the at least one of the first signal and the second signal between the network node 10 and the second node 10, 20 by at least one of causing the communications interface 18 to transmit the at least one of the first signal and the second signal to the second node 10, 20 and causing the communications interface 18 to receive the at least one of the first signal and the second signal from the second node 10, 20. In some embodiments, the second node 10, 20 is a wireless device 20. In some embodiments, the network node 10 includes a communications interface 18 in communication with the processing circuitry 12, the processing circuitry 12 configured to: cause the communications interface 18 to receive from at least one of the second node 10, 20 and another node 10, 20 information regarding the at least one parameter; and switch between the first signal and the second signal based at least upon the received information regarding the at least one parameter. In some embodiments, the processing circuitry 12 is further configured to switch between the first signal and the second signal based on a numerology supported by the second node 10, 20. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to another aspect, a method in a wireless device 20 for switching between different numerologies supported by the wireless device 20 is provided. The method includes determining at least one parameter that can be used by the wireless device 20 for switching between a first signal operating with a first numerology and a second signal operating with a second numerology (Block S130); switching between the first signal and the second signal based on the at least one parameter (Block S140); and after the switching, operating at least one of the first signal and the second signal between the wireless device 20 and a second node 10, 20 (Block S150).

According to this aspect, in some embodiments, the at least one parameter includes an interruption time due to switching. In some embodiments, the at least one parameter includes a predefined value corresponding to a maximum allowed interruption time due to switching. In some embodiments, the at least one parameter includes at least one of numerology switching delay time, frequency of switching between numerologies, specific time resources allowed for switching, time resources restricted for switching, numerologies allowed for switching, and part of a spectrum allowed for switching. In some embodiments, the first numerology is a first subcarrier spacing and the second numerology is a second subcarrier spacing, the second subcarrier spacing being different from the first subcarrier spacing. In some embodiments, the method further includes restricting scheduling of at least one of a downlink and an uplink transmission in at least one subframe adjacent a multicast having a different numerology. In some embodiments, operating the at least one of the first signal and the second signal between the network node 10 and the second node 10, 20 comprises at least one of transmitting the at least one of the first signal and the second signal to the second node 10, 20 and receiving the at least one of the first signal and the second signal from the second node 10, 20. In some embodiments, the second node 10, 20 is one of a second wireless device 20 and a network node 10. In some embodiments, the method further includes receiving from at least one of the second node 10, 20 and another node 10, 20 information regarding the at least one parameter; and switching between the first signal and the second signal based on the at least one parameter comprises switching between the first signal and the second signal based at least upon the received information regarding the at least one parameter. In some embodiments, switching between the first signal and the second signal is further based on a numerology supported by the second node 10, 20. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to another aspect, a wireless device 20 configured to switch between different numerologies supported by the wireless device 20 is provided. The wireless device 20 includes processing circuitry 22 configured to determine at least one parameter that can be used by the network node 10 for switching between a first signal operating with a first numerology and a second signal operating with a second numerology; switch between the first signal and the second signal based on the at least one parameter; and after the switching, operate at least one of the first signal and the second signal between the network node 10 and a second node 10, 20.

According to this aspect, in some embodiments, the at least one parameter includes an interruption time due to switching. In some embodiments, the at least one parameter includes a predefined value corresponding to a maximum allowed interruption time due to switching. In some embodiments, the at least one parameter includes at least one of numerology switching delay time, frequency of switching between numerologies, specific time resources allowed for switching, time resources restricted for switching, numerologies allowed for switching, and part of a spectrum allowed for switching. In some embodiments, the first numerology is a first subcarrier spacing and the second numerology is a second subcarrier spacing, the second subcarrier spacing being different from the first subcarrier spacing. In some embodiments, the processing circuitry 22 is further configured to restrict scheduling of at least one of a downlink and an uplink transmission in at least one subframe adjacent a multicast having a different numerology. In some embodiments, the wireless device 20 further includes a communications interface 28 in communication with the processing circuitry 22, the processing circuitry 22 configured to operate the at least one of the first signal and the second signal between the network node 10 and the second node 10, 20 by at least one of causing the communications interface 28 to transmit the at least one of the first signal and the second signal to the second node 10, 20 and causing the communications interface 28 to receive the at least one of the first signal and the second signal from the second node 10, 20. In some embodiments, the second node 10, 20 is one of a second wireless device 20 and a network node 10. In some embodiments, the wireless device 20 further includes a communications interface 28 in communication with the processing circuitry 22, the processing circuitry 22 configured to: cause the communications interface 28 to receive from at least one of the second node 10, 20 and another node 10, 20 information regarding the at least one parameter; and switch between the first signal and the second signal based at least upon the received information regarding the at least one parameter. In some embodiments, the processing circuitry 22 is further configured to switch between the first signal and the second signal based on a numerology supported by the second node 10, 20. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to one aspect, a method in a network node 10 for switching between different numerologies supported by the network node 10 and a second node 10, 20 is provided. The method includes determining at least one first parameter used by the network node 10 for switching between a first signal operating with a first numerology and a second signal operating with a second numerology (Block S160); determining at least one second parameter used by the second node 10, 20 for switching between the first signal operating with the first numerology and the second signal operating with the second numerology (Block S170); determining a third parameter that is a function of at least one of the at least one first parameter and the at least one second parameter (Block S180); and using the third parameter for at least one operational task (Block S190).

According to this aspect, in some embodiments, the at least one of the at least one first parameter and the at least one second parameter includes an interruption time due to switching. In some embodiments, the at least one of the at least one first parameter and the at least one second parameter includes a predefined value corresponding to a maximum allowed interruption time due to switching. In some embodiments, a value of the at least one first parameter is the same as a value of the at least one second parameter. In some embodiments, a value of the at least one first parameter is different than a value of the at least one second parameter. In some embodiments, the at least one second parameter includes a parameter that is determined based on at least one of predefined information, receiving information about the at least one second parameter associated with the second node 10, 20 from another node 10, 20, at least one of statistics and historical data, and feedback from the second node 10, 20. In some embodiments, the at least one operational task includes at least one of configuring the second node 10, 20 with information related to a determined value of the third parameter, transmitting information related to the determined value of the third parameter, using the information related to the determined value of the third parameter for scheduling of signals exchanged with the second node 10, 20, and performing switching between the first signal and the second signal based on the determined value of the third parameter. In some embodiments, the at least one operational task comprises at least one of transmitting the at least one of the first signal and the second signal to the second node 10, 20 and receiving the at least one of the first signal and the second signal from the second node 10, 20. In some embodiments, the second node 10, 20 is a wireless device 20. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to another aspect, a network node 10 configured to switch between different numerologies supported by the network node 10 and a second node 10, 20 is provided. The network node 10 includes processing circuitry 12 configured to determine at least one first parameter used by the network node 10 for switching between a first signal operating with a first numerology and a second signal operating with a second numerology; determine at least one second parameter used by the second node 10, 20 for switching between the first signal operating with the first numerology and the second signal operating with the second numerology; determine a third parameter that is a function of at least one of the at least one first parameter and the at least one second parameter; and use the third parameter for at least one operational task.

According to this aspect, in some embodiments, the at least one of the at least one first parameter and the at least one second parameter includes an interruption time due to switching. In some embodiments, the at least one of the at least one first parameter and the at least one second parameter includes a predefined value corresponding to a maximum allowed interruption time due to switching. In some embodiments, a value of the at least one first parameter is the same as a value of the at least one second parameter. In some embodiments, a value of the at least one first parameter is different than a value of the at least one second parameter. In some embodiments, the at least one second parameter includes a parameter determined based on at least one of predefined information, receiving information about the at least one second parameter associated with the second node 10, 20 from another node 10, 20, at least one of statistics and historical data, and feedback from the second node 10, 20. In some embodiments, the at least one operational task includes at least one of configuring the second node 10, 20 with information related to a determined value of the third parameter, transmitting information related to the determined value of the third parameter, using the information related to the determined value of the third parameter for scheduling of signals exchanged with the second node 10, 20, and performing switching between the first signal and the second signal based on the determined value of the third parameter. In some embodiments, the at least one operational task comprises at least one of transmitting the at least one of the first signal and the second signal to the second node 10, 20 and receiving the at least one of the first signal and the second signal from the second node 10, 20. In some embodiments, the second node 10, 20 is a wireless device 20. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to an aspect, a method in a wireless device 20 for switching between different numerologies supported by the wireless device 20 and a second node 10, 20 is provided. The method includes determining at least one first parameter used by the wireless device 20 for switching between a first signal operating with a first numerology and a second signal operating with a second numerology (Block S200); determining at least one second parameter used by the second node 10, 20 for switching between the first signal operating with the first numerology and the second signal operating with the second numerology (Block S210); determining a third parameter that is a function of at least one of the at least one first parameter and the at least one second parameter (Block S220); and using the third parameter for at least one operational task (Block S230).

According to this aspect, in some embodiments, the at least one of the at least one first parameter and the at least one second parameter includes an interruption time due to switching. In some embodiments, the at least one of the at least one first parameter and the at least one second parameter includes a predefined value corresponding to a maximum allowed interruption time due to switching. In some embodiments, a value of the at least one first parameter is the same as a value of the at least one second parameter. In some embodiments, a value of the at least one first parameter is different than a value of the at least one second parameter. In some embodiments, the at least one second parameter includes a parameter that is determined based on at least one of predefined information, receiving information about the at least one second parameter associated with the second node 10, 20 from another node 10, 20, at least one of statistics and historical data, and feedback from the second node 10, 20. In some embodiments, the at least one operational task includes at least one of configuring the second node 10, 20 with information related to a determined value of the third parameter, transmitting information related to the determined value of the third parameter, using the information related to the determined value of the third parameter for scheduling of signals exchanged with the second node 10, 20, and performing switching between the first signal and the second signal based on the determined value of the third parameter. In some embodiments, the at least one operational task comprises at least one of transmitting the at least one of the first signal and the second signal to the second node 10, 20 and receiving the at least one of the first signal and the second signal from the second node 10, 20. In some embodiments, the second node 10, 20 is a second wireless device 20. In some embodiments, the second node 10, 20 is a network node 10. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to one aspect, a wireless device 20 configured to switch between different numerologies supported by the wireless device 20 and a second node 10, 20 is provided. The wireless device 20 includes processing circuitry 22 configured to: determine at least one first parameter used by the wireless device 20 for switching between a first signal operating with a first numerology and a second signal operating with a second numerology; determine at least one second parameter used by the second node 10, 20 for switching between the first signal operating with the first numerology and the second signal operating with the second numerology; determine a third parameter that is a function of at least one of the at least one first parameter and the at least one second parameter; and use the third parameter for at least one operational task.

According to this aspect, in some embodiments, the at least one of the at least one first parameter and the at least one second parameter includes an interruption time due to switching. In some embodiments, the at least one of the at least one first parameter and the at least one second parameter includes a predefined value corresponding to a maximum allowed interruption time due to switching. In some embodiments, a value of the at least one first parameter is the same as a value of the at least one second parameter. In some embodiments, a value of the at least one first parameter is different than a value of the at least one second parameter. In some embodiments, the at least one second parameter is determined based on at least one of predefined information, receiving information about the at least one second parameter associated with the second node 10, 20 from another node 10, 20, at least one of statistics and historical data, and feedback from the second node 10, 20. In some embodiments, the at least one operational task includes at least one of configuring the second node 10, 20 with information related to a determined value of the third parameter, transmitting information related to the determined value of the third parameter, using the information related to the determined value of the third parameter for scheduling of signals exchanged with the second node 10, 20, and performing switching between the first signal and the second signal based on the determined value of the third parameter. In some embodiments, the at least one operational task comprises at least one of transmitting the at least one of the first signal and the second signal to the second node 10, 20 and receiving the at least one of the first signal and the second signal from the second node 10, 20. In some embodiments, the second node 10, 20 is a second wireless device 20. In some embodiments, the second node 10, 20 is a network node 10. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to one aspect, a method in a network node 10 for switching between different numerologies supported by the network node 10 and another node 10, 20 is provided. The method includes receiving from the other node information regarding at least one first parameter to be used by the network node 10 for switching between a first signal operating with a first numerology and a second signal operating with a second numerology (Block S240); switching between the first signal and the second signal based at least upon the received information regarding the at least one first parameter (Block S250); and after the switching, operating at least one of the first signal and the second signal between the network node 10 and the other node (Block S260).

According to this aspect, in some embodiments, the at least one first parameter includes an interruption time due to switching. In some embodiments, the at least one first parameter includes a predefined value corresponding to a maximum allowed interruption time due to switching. In some embodiments, the method further includes transmitting to the other node information regarding at least one second parameter used by the network node 10 for switching between the first signal operating with the first numerology and the second signal operating with the second numerology. In some embodiments, the information regarding the at least one second parameter used by the network node 10 transmitted to the other node 10, 20 is transmitted in response to receiving a request by the other node 10, 20. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to an aspect, a network node 10 configured to switch between different numerologies supported by the network node 10 and another node 10, 20 is provided. The network node 10 includes a communications interface 18 configured to: receive from the other node 10, 20 information regarding at least one first parameter to be used by the network node 10 for switching between a first signal operating with a first numerology and a second signal operating with a second numerology; and processing circuitry 12 configured to: switch between the first signal and the second signal based at least upon the received information regarding the at least one first parameter; and after the switching, operate at least one of the first signal and the second signal between the network node 10 and the other node 10, 20.

According to this aspect, in some embodiments, the at least one first parameter includes an interruption time due to switching. In some embodiments, the at least one first parameter includes a predefined value corresponding to a maximum allowed interruption time due to switching. In some embodiments, the communications interface 18 is further configured to transmit to the other node 10, 20 information regarding at least one second parameter used by the network node 10 for switching between the first signal operating with the first numerology and the second signal operating with the second numerology. In some embodiments, the information regarding the at least one second parameter used by the network node 10 transmitted to the other node 10, 20 is transmitted in response to receiving a request by the other node 10, 20. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to one aspect, a method in a wireless device 20 for switching between different numerologies supported by the wireless device 20 and another node 10, 20 is provided. The method includes receiving from the other node 10, 20 information regarding at least one first parameter to be used by the wireless device 20 for switching between a first signal operating with a first numerology and a second signal operating with a second numerology (Block S270); switching between the first signal and the second signal based at least upon the received information regarding the at least one first parameter (Block S280); and after the switching, operating at least one of the first signal and the second signal between the wireless device 20 and the other node 10, 20 (Block S290).

According to this aspect, in some embodiments, the at least one first parameter includes an interruption time due to switching. In some embodiments, the at least one first parameter includes a predefined value corresponding to a maximum allowed interruption time due to switching. In some embodiments, the method further includes transmitting to the other node 10, 20 information regarding at least one second parameter used by the wireless device 20 for switching between the first signal operating with the first numerology and the second signal operating with the second numerology. In some embodiments, the information regarding the at least one second parameter used by the wireless device 20 transmitted to the other node 10, 20 is transmitted in response to receiving a request by the other node 10, 20. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to one aspect, a wireless device 20 configured to switch between different numerologies supported by the wireless device 20 and another node 10, 20 is provided. The wireless device 20 includes a communications interface 28 configured to receive from the other node 10, 20 information regarding at least one first parameter to be used by the wireless device 20 for switching between a first signal operating with a first numerology and a second signal operating with a second numerology; and processing circuitry 22 configured to: switch between the first signal and the second signal based at least upon the received information regarding the at least one first parameter; and after the switching, operate at least one of the first signal and the second signal between the wireless device 20 and the other node 10, 20.

According to this aspect, in some embodiments, the at least one first parameter includes an interruption time due to switching. In some embodiments, the at least one first parameter includes a predefined value corresponding to a maximum allowed interruption time due to switching. In some embodiments, the communications interface 28 is further configured to transmit to the other node 10, 20 information regarding at least one second parameter used by the wireless device 20 for switching between the first signal operating with the first numerology and the second signal operating with the second numerology. In some embodiments, the information regarding the at least one second parameter used by the wireless device 20 transmitted to the other node 10, 20 is transmitted in response to receiving a request by the other node 10, 20. In some embodiments, one of the first signal and the second signal is comprised in at least one non-Multimedia Broadcast Single Frequency Network (non-MBSFN) subframe and the other of the first signal and the second signal is comprised in at least one Multimedia Broadcast Single Frequency Network (MBSFN) subframe.

According to one aspect, a network node 10 configured to switch between different numerologies supported by the network node 10 is provided. The network node 10 includes a parameter determination module 32 configured to determine at least one parameter that can be used by the network node 10 for switching between a first signal operating with a first numerology and a second signal operating with a second numerology; a signal switching module 34 configured to switch between the first signal and the second signal based on the at least one parameter; and a signal operation module 36 configured to, after the switching, operate at least one of the first signal and the second signal between the network node 10 and a second node 10, 20.

According to one aspect, a wireless device 20 configured to switch between different numerologies supported by the wireless device 20 is provided. The wireless device 20 includes a parameter determination module 38 configured to determine at least one parameter that can be used by the wireless device 20 for switching between a first signal operating with a first numerology and a second signal operating with a second numerology; a signal switching module 40 configured to switch between the first signal and the second signal based on the at least one parameter; and a signal operation module 42 configured to, after the switching, operate at least one of the first signal and the second signal between the wireless device 20 and a second node 10, 20.

According to one aspect, a network node 10 configured to switch between different numerologies supported by the network node 10 is provided. The network node 10 includes a parameter determination module 32 configured to: determine at least one first parameter used by the network node 10 for switching between a first signal operating with a first numerology and a second signal operating with a second numerology; determine at least one second parameter used by the second node 10, 20 for switching between the first signal operating with the first numerology and the second signal operating with the second numerology; and determine a third parameter that is a function of at least one of the at least one first parameter and the at least one second parameter; and a parameter implementation module 44 configured to use the third parameter for at least one operational task.

According to one aspect, a wireless device 20 configured to switch between different numerologies supported by the wireless device 20 is provided. The wireless device 20 includes a parameter determination module 38 configured to: determine at least one first parameter used by the wireless device 20 for switching between a first signal operating with a first numerology and a second signal operating with a second numerology; determine at least one second parameter used by the second node 10, 20 for switching between the first signal operating with the first numerology and the second signal operating with the second numerology; and determine a third parameter that is a function of at least one of the at least one first parameter and the at least one second parameter; and a parameter implementation module 46 configured to use the third parameter for at least one operational task.

According to another aspect, a network node 10 configured to switch between different numerologies supported by the network node 10 and another node 10, 20 is provided. The network node 10 includes a communications interface module 48 configured to receive from the other node 10, 20 information regarding at least one first parameter to be used by the network node 10 for switching between a first signal operating with a first numerology and a second signal operating with a second numerology; a signal switching module 34 configured to switch between the first signal and the second signal based at least upon the received information regarding the at least one first parameter; and a signal operation module 36 configured to, after the switching, operate at least one of the first signal and the second signal between the network node 10 and the other node 10, 20.

According to another aspect, a wireless device 20 configured to switch between different numerologies supported by the wireless device 20 and another node 10, 20 is provided. The wireless device 20 includes a communications interface module 50 configured to receive from the other node 10, 20 information regarding at least one first parameter to be used by the wireless device 20 for switching between a first signal operating with a first numerology and a second signal operating with a second numerology; a signal switching module 40 configured to switch between the first signal and the second signal based at least upon the received information regarding the at least one first parameter; and a signal operation module 42 configured to, after the switching, operate at least one of the first signal and the second signal between the wireless device 20 and the other node 10, 20.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node for switching between different numerologies supported by the network node, the method comprising:
    determining at least one parameter that can be used by the network node for switching between a first signal operating with a first numerology and a second signal operating with a second numerology, the first numerology being a first subcarrier spacing and the second numerology being a second subcarrier spacing, the second subcarrier spacing being different from the first subcarrier spacing;
    switching between the first signal and the second signal based on the at least one parameter, the at least one parameter including a frequency of switching between numerologies and a preferred value corresponding to a maximum allowed interruption time due to switching from the first numerology of the first signal to the second numerology of the second signal; and
    after the switching, operating at least one of the first signal and the second signal between the network node and a second node.

2. The method of claim 1, wherein the at least one parameter includes at least one of numerology switching delay time, specific time resources allowed for switching, time resources restricted for switching, numerologies allowed for switching, and part of a spectrum allowed for switching.

3. The method of claim 1, further comprising restricting scheduling of at least one of a downlink and an uplink transmission in at least one subframe adjacent a multicast having a different numerology.

4. The method of claim 1, wherein operating the at least one of the first signal and the second signal between the network node and the second node comprises at least one of transmitting the at least one of the first signal and the second signal to the second node and receiving the at least one of the first signal and the second signal from the second node.

5. The method of claim 1, wherein the second node is a wireless device.

6. The method of claim 1, further comprising receiving from at least one of the second node and another node information regarding the at least one parameter; and
    wherein switching between the first signal and the second signal based on the at least one parameter comprises switching between the first signal and the second signal based at least upon the received information regarding the at least one parameter.

7. The method of claim 1, wherein switching between the first signal and the second signal is further based on a numerology supported by the second node.

8. The method of claim 1, wherein one of the first signal and the second signal is comprised in at least one non-Multimedia Broadcast Single Frequency Network, non-MBSFN, subframe and the other of the first signal and the second signal is comprised in at least one Multimedia Broadcast Single Frequency Network, MBSFN, subframe.

9. A network node configured to switch between different numerologies supported by the network node, the network node comprising processing circuitry configured to:
    determine at least one parameter that can be used by the network node for switching between a first signal operating with a first numerology and a second signal operating with a second numerology, the first numerology being a first subcarrier spacing and the second numerology being a second subcarrier spacing, the second subcarrier spacing being different from the first subcarrier spacing;
    switch between the first signal and the second signal based on the at least one parameter, the at least one parameter including a frequency of switching between numerologies and a preferred value corresponding to a maximum allowed interruption time due to switching from the first numerology of the first signal to the second numerology of the second signal; and
    after the switching, operate at least one of the first signal and the second signal between the network node and a second node.

10. The network node of claim 9, wherein the at least one parameter includes at least one of numerology switching delay time, specific time resources allowed for switching, time resources restricted for switching, numerologies allowed for switching, and part of a spectrum allowed for switching.

11. The network node of claim 9, wherein the processing circuitry is further configured to restrict scheduling of at least one of a downlink and an uplink transmission in at least one subframe adjacent a multicast having a different numerology.

12. The network node of claim 9, further comprising a communications interface in communication with the processing circuitry, the processing circuitry configured to operate the at least one of the first signal and the second signal between the network node and the second node by at least one of causing the communications interface to transmit the at least one of the first signal and the second signal to the second node and causing the communications interface to receive the at least one of the first signal and the second signal from the second node.

13. The network node of claim 9, wherein the second node is a wireless device.

14. The network node of claim 9, further comprising a communications interface in communication with the processing circuitry, the processing circuitry configured to:
    cause the communications interface to receive from at least one of the second node and another node information regarding the at least one parameter; and
    switch between the first signal and the second signal based at least upon the received information regarding the at least one parameter.

15. The network node of claim 9, wherein the processing circuitry is further configured to switch between the first signal and the second signal based on a numerology supported by the second node.

16. The network node of claim 9, wherein one of the first signal and the second signal is comprised in at least one non-Multimedia Broadcast Single Frequency Network, non-MBSFN, subframe and the other of the first signal and the second signal is comprised in at least one Multimedia Broadcast Single Frequency Network, MBSFN, subframe.

17. The method of claim 2, further comprising restricting scheduling of at least one of a downlink and an uplink transmission in at least one subframe adjacent a multicast having a different numerology.

18. The method of claim 2, wherein operating the at least one of the first signal and the second signal between the network node and the second node comprises at least one of transmitting the at least one of the first signal and the second signal to the second node and receiving the at least one of the first signal and the second signal from the second node.

19. The method of claim 2, further comprising receiving from at least one of the second node and another node information regarding the at least one parameter; and
   wherein switching between the first signal and the second signal based on the at least one parameter comprises switching between the first signal and the second signal based at least upon the received information regarding the at least one parameter.

20. The method of claim 2, wherein switching between the first signal and the second signal is further based on a numerology supported by the second node.

* * * * *